United States Patent
Achiwa et al.

(10) Patent No.: US 7,143,252 B2
(45) Date of Patent: *Nov. 28, 2006

(54) STORAGE APPARATUS SYSTEM AND METHOD OF DATA BACKUP

(75) Inventors: Kyosuke Achiwa, Yokohama (JP); Takashi Oeda, Sagamihara (JP); Katsunori Nakamura, Odawarra (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/657,010

(22) Filed: Sep. 5, 2003

(65) Prior Publication Data

US 2004/0064659 A1 Apr. 1, 2004

Related U.S. Application Data

(63) Continuation of application No. 09/854,125, filed on May 10, 2001, now Pat. No. 6,643,750.

(51) Int. Cl.
*G06F 12/00* (2006.01)

(52) U.S. Cl. ............................. 711/162; 714/6; 714/20
(58) Field of Classification Search ................ 711/161, 711/162; 714/6, 20
See application file for complete search history.

(56) References Cited

U.S. PATENT DOCUMENTS

| | | | |
|---|---|---|---|
| 3,990,055 A | 11/1976 | Henderson et al. | |
| 4,451,884 A | 5/1984 | Heath et al. | |
| 5,155,845 A | 10/1992 | Beal et al. | |
| 5,206,939 A | 4/1993 | Yanai et al. | |
| 5,235,690 A | 8/1993 | Beardsley et al. | |
| 5,379,398 A | 1/1995 | Cohn et al. | |
| 5,522,037 A | 5/1996 | Kitagawa et al. | |
| 5,544,347 A | 8/1996 | Yanai et al. | |
| 5,572,699 A | 11/1996 | Kamo et al. | |
| 5,588,012 A | 12/1996 | Oizumi | |

(Continued)

FOREIGN PATENT DOCUMENTS

| | | |
|---|---|---|
| JP | 58-151660 | 9/1983 |
| JP | 58-219656 | 12/1983 |
| JP | 64-033770 | 2/1989 |
| JP | 02-059934 | 2/1990 |
| JP | 03-204023 | 9/1991 |

(Continued)

OTHER PUBLICATIONS

Rosenblum "The Design and Implementation of a Log–Structured File System," ACM Transactions on Computer Systems 10:26–52 (1992).

(Continued)

*Primary Examiner*—Mano Padmanabhan
*Assistant Examiner*—Paul Baker
(74) *Attorney, Agent, or Firm*—Townsend and Townsend and Crew LLP

(57) ABSTRACT

In a storage apparatus system, after having obtained the coherency between a file system of a main storage apparatus system and the stored data, a host computer issues a freezing instruction to a main DKC which transfers in turn the disk image at a time point of the issue of freezing instruction to a sub-DKC and then transmits a signal, showing that all the data has been transmitted, to the sub-DKC. In the sub-DKC, the disk image at a time point of reception of the freezing instruction is held until a signal showing that all the data has been transmitted is issued next time, and when the main storage apparatus system becomes unusable at an arbitrary time point, the data of the disk image, at a time point of issue of the freezing instruction, which is held by the sub-storage apparatus system can be utilized.

6 Claims, 28 Drawing Sheets

U.S. PATENT DOCUMENTS

| | | | |
|---|---|---|---|
| 5,613,155 A | | 3/1997 | Baldiga et al. |
| 5,625,840 A | | 4/1997 | Numata et al. |
| 5,644,787 A | | 7/1997 | Nakamura et al. |
| 5,664,144 A | | 9/1997 | Yanai et al. |
| 5,680,640 A | | 10/1997 | Ofek et al. |
| 5,692,155 A | | 11/1997 | Iskiyan et al. |
| 5,740,465 A | | 4/1998 | Matsunami et al. |
| 5,742,792 A | | 4/1998 | Yanai et al. |
| 5,819,020 A | | 10/1998 | Beeler, Jr. |
| 5,835,954 A | | 11/1998 | Duyanovich et al. |
| 5,845,328 A | * | 12/1998 | Maya et al. ............ 711/162 |
| 5,896,548 A | | 4/1999 | Ofek |
| 5,901,327 A | | 5/1999 | Ofek |
| 5,909,692 A | | 6/1999 | Yanai et al. |
| 5,940,865 A | | 8/1999 | Ohzora et al. |
| 5,960,216 A | | 9/1999 | Vishlitzky et al. |
| 5,978,890 A | | 11/1999 | Ozawa et al. |
| 5,996,045 A | | 11/1999 | Lee et al. |
| 6,003,114 A | | 12/1999 | Bachmat |
| 6,173,377 B1 | | 1/2001 | Yanai et al. |
| 6,185,653 B1 | | 2/2001 | Yanai et al. |
| 6,230,239 B1 | | 5/2001 | Sakaki et al. |
| 6,240,494 B1 | | 5/2001 | Nagasawa et al. |
| 6,247,046 B1 | | 6/2001 | Yanai et al. |
| 6,286,085 B1 | | 9/2001 | Jouenne et al. |
| 6,378,054 B1 | | 4/2002 | Karasudani et al. |
| 6,418,509 B1 | | 7/2002 | Yanai et al. |
| 6,487,645 B1 | | 11/2002 | Clark et al. |
| 6,502,205 B1 | | 12/2002 | Yanai et al. |
| 6,539,462 B1 | | 3/2003 | Mikkelson et al. |
| 6,578,120 B1 | | 7/2003 | Ofek |
| 6,587,919 B1 | | 7/2003 | Yanai et al. |
| 6,587,935 B1 | | 7/2003 | Ofek |
| 6,594,744 B1 | * | 7/2003 | Humlicek et al. ......... 711/162 |
| 6,625,705 B1 | | 9/2003 | Yanai et al. |
| 6,640,291 B1 | | 10/2003 | Fujibayashi et al. |
| 6,647,473 B1 | * | 11/2003 | Golds et al. ............ 711/161 |
| 6,647,474 B1 | | 11/2003 | Yanai et al. |
| 6,671,705 B1 | | 12/2003 | Duprey et al. |
| 6,760,723 B1 | | 7/2004 | Oshinsky et al. |
| 6,779,094 B1 | * | 8/2004 | Selkirk et al. ............ 711/165 |
| 6,804,755 B1 | * | 10/2004 | Selkirk et al. ............ 711/165 |
| 2002/0015338 A1 | | 2/2002 | Watkins et al. |
| 2002/0116404 A1 | | 8/2002 | Cha et al. |
| 2003/0167419 A1 | | 9/2003 | Yanai et al. |
| 2004/0167942 A1 | | 8/2004 | Oshinsky et al. |

FOREIGN PATENT DOCUMENTS

| | | |
|---|---|---|
| JP | 06-067811 | 3/1994 |
| JP | 06-250795 | 9/1994 |
| JP | 07-191811 | 7/1995 |
| JP | 07-201132 | 8/1995 |
| JP | 07-271521 A | 10/1995 |
| JP | 09-325863 | 12/1997 |
| JP | 11-338847 | 12/1999 |
| JP | 2000-305856 | 11/2000 |
| WO | WO 98/20419 A1 | 5/1998 |
| WO | WO 01/04754 A2 | 1/2001 |

OTHER PUBLICATIONS

Burns et al., "A Linear Time, Constant Space Differencing Algorithm," IEEE proceedings of the 1997 Performance, Computing, and Communications Conference pp. 429–436 (Feb. 1997).

Svobodova "File Servers For Network–Based Distributed Systems," ACM Computing Surveys 16:353–398 (Dec. 1984).

"Symmetrix Data Migration Services (SDMS)" EMC2 Symmetrix ICDA Family Product Information (2000).

* cited by examiner

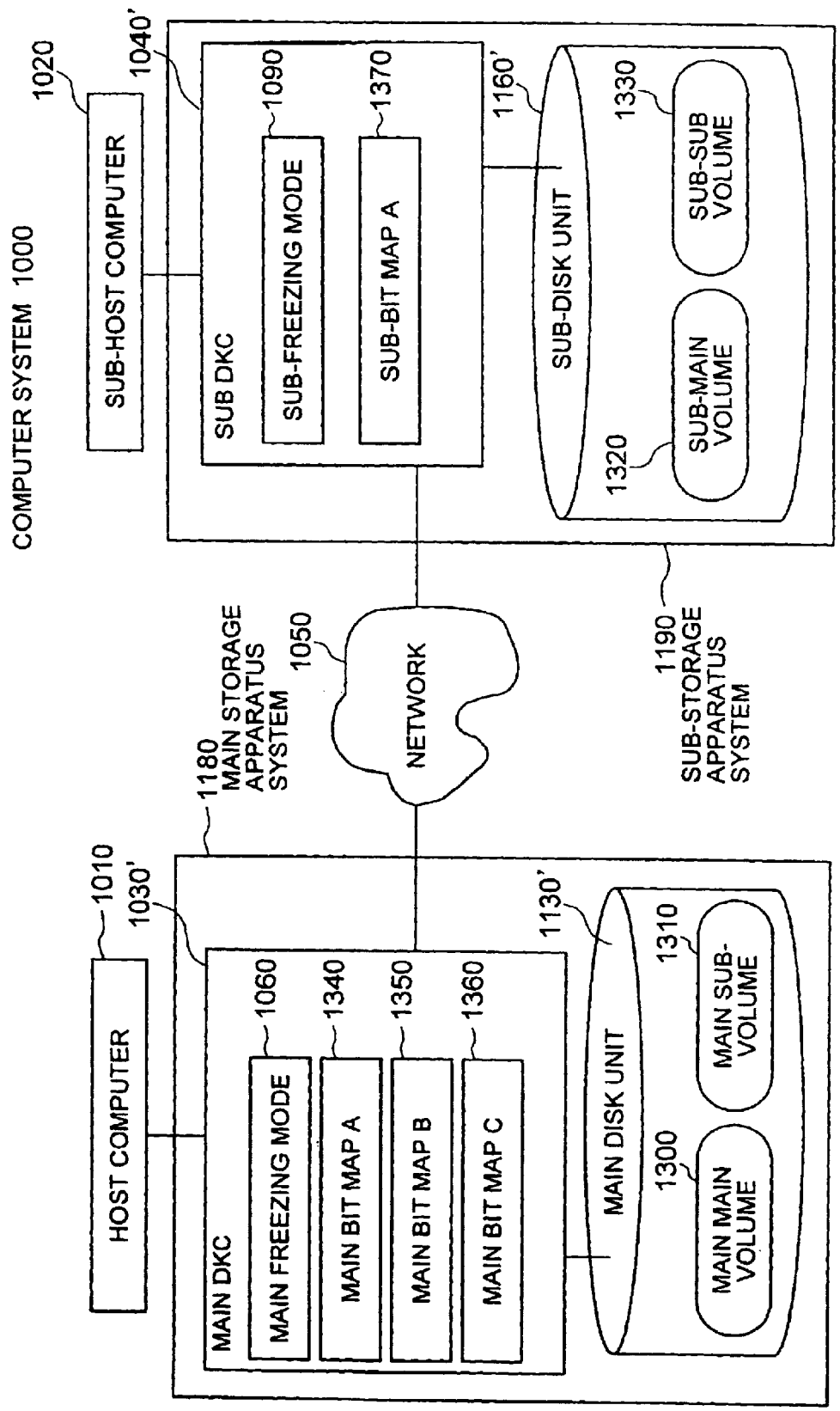

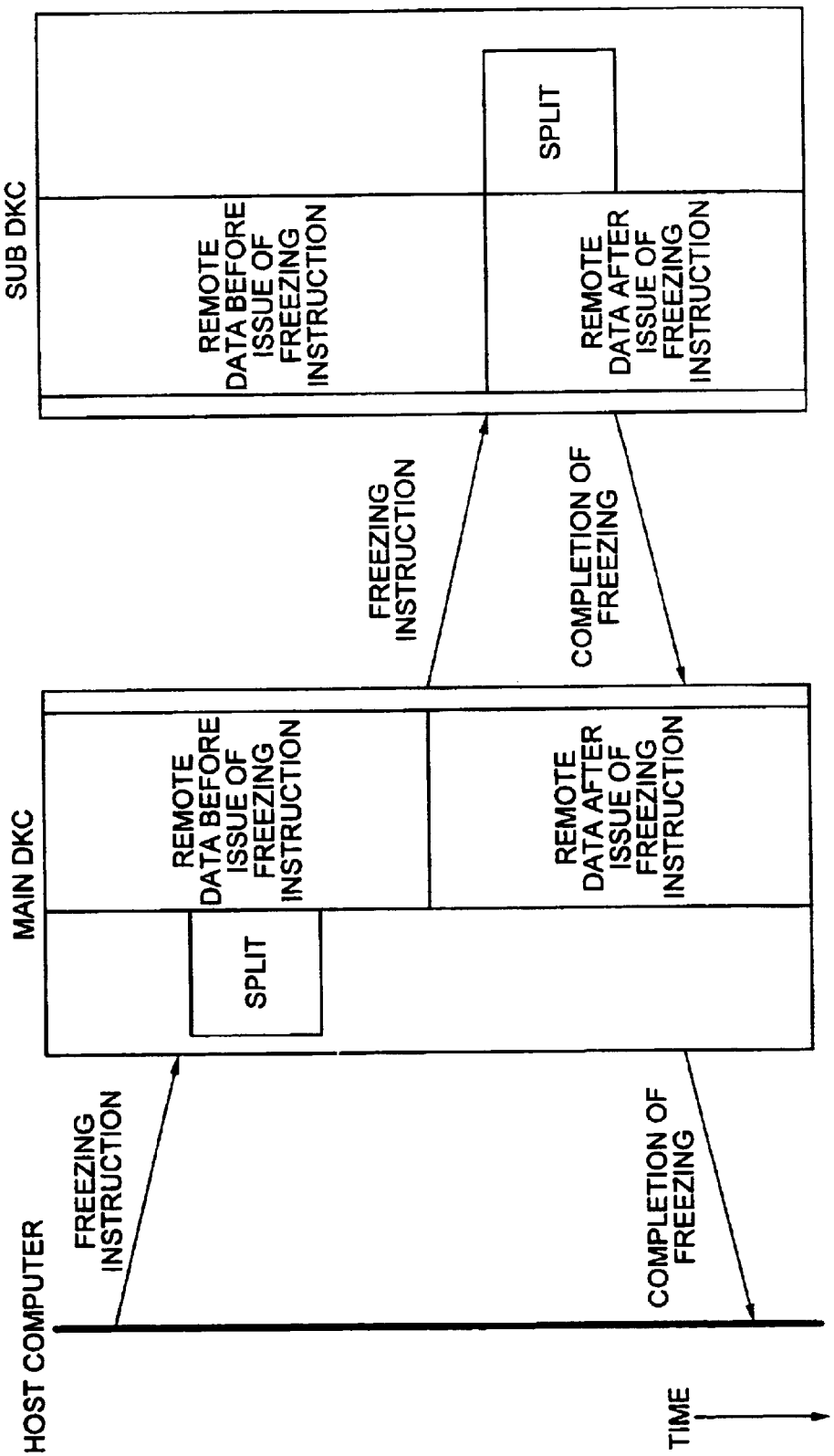

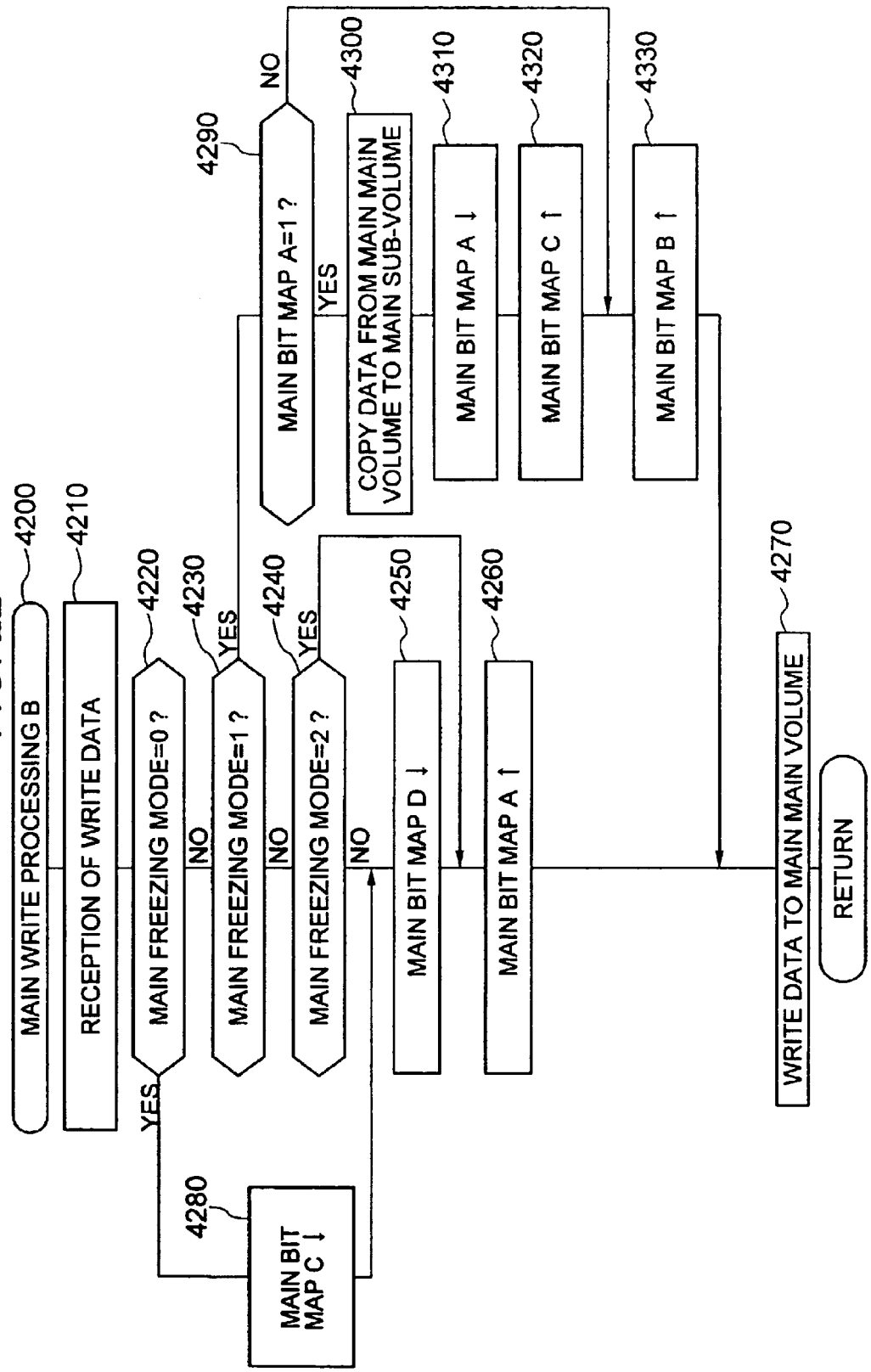

STORAGE APPARATUS SYSTEM AND METHOD OF DATA BACKUP

CROSS REFERENCE TO RELATED APPLICATION

This application is a continuation of U.S. application Ser. No. 09/854,125 filed May 10, 2001 now U.S. Pat. No. 6,643,750, incorporated by reference herein for all purposes.

BACKGROUND OF THE INVENTION

The present invention relates in general to a storage apparatus system for carrying out the copy (the remote copy) of data to another storage apparatus system which is located in an out-of-the-way place. More particularly, the invention relates to an information processing system for carrying out the remote copy which is of the type in which the order of writing data from a host computer to a storage apparatus system does not match the order of transmitting data from a storage apparatus system having the data written thereto to another storage apparatus system.

In an information processing system having a host computer and a plurality of storage apparatus systems, as the technology of carrying out the copy of data between the storage apparatus systems, there is known the remote copy.

By the remote copy is meant the technology in which a plurality of storage apparatus systems which are located physically apart from one another carry out the copy of the data, i.e., the double writing of the data between the storage apparatus systems without interposition of the host computer.

The storage apparatus system is a system including a plurality of storage apparatuses and a controller for controlling these storage apparatuses.

In the information processing system which carries out the remote copy, the storage apparatus systems which are respectively arranged in the places physically remote from one another are electrically connected to one another through dedicated lines or public lines. Of logical storage areas (hereinafter, referred to as "logical volumes", when applicable) which a certain storage apparatus system has, the logical volume having the same capacity as that of the logical volume subjected to the remote copy (hereinafter, referred to as "the source volume" for short, when applicable) is ensured in the storage apparatus system to which the logical volume as the source of the copy is copied. This ensured logical volume (hereinafter, referred to as "the destination volume", when applicable) is formed in such a way as to show one-to-one correspondence relation with the logical volume as the source of the copy.

The data of the logical volume as the source of the copy is copied to the logical volume as the destination of the copy through the associated one of the dedicated lines or public lines.

When the data contained in the logical volume as the source of the copy is updated, the updated data is transferred to the storage apparatus system having the logical volume as the destination of the copy through the associated one of the dedicated lines or the like and the updated data is also written to the logical volume as the destination of the copy corresponding to the logical volume as the source of the copy.

If the technique of the remote copy is employed, then in the information processing system having a plurality of storage apparatus systems, the logical volume of the same contents can be held in a plurality of storage apparatus systems.

The technique relating to the remote copy is disclosed in U.S. Pat. No. 5,742,792. In U.S. Pat. No. 5,742,792, the technique called the adaptive copy is further disclosed.

By the adaptive copy is meant one of the remote copy techniques. The adaptive copy is the remote copy method wherein before the data written from the host computer to the local storage device is copied to the remote storage device, the information exhibiting the completion of write is returned back to the host computer.

In the adaptive copy, the transmission order of data is not serialized, and hence the order of writing the data to the logical volume as the source of the copy by the host computer may be different from the order of transferring these data to the logical volume as the destination of the copy in some cases (hereinafter, such remote copy is referred to as the remote copy of "no guarantee to order", when applicable).

When the host computer writes repeatedly data to the same location in the destination volume on the basis of that property, only the data which has been written thereto lastly can be transmitted to the storage apparatus system having the logical volume as the destination of the copy. Therefore, the load on the network such as the dedicated line between the storage apparatus systems can be reduced.

On the other hand, when the host computer in which the file system used in the so-called open system is incorporated writes the data to the storage apparatus system, in general, the buffer and the like provided in the host computer, whereby an instruction to transfer the data from an application program to the file system is made asynchronously with the operation of writing the data to the storage apparatus system.

But, in the case that the data in the file is destroyed due to various problems, in order to keep the coherency of the file system structure, with respect to at least the directory and the meta-data such as i-node which are used to manage the file system, the operation of issuing an instruction to transfer the data, i.e., the directory and the meta-data from the host computer to the storage apparatus system is carried out synchronously with issuing of the write command from the application program running on the host computer to the file system. The above-mentioned technique is disclosed in an article of "The Design and Implementation of a Log-Structured File System", Mendel Resenblum and John K. Ousterhout, ACM Transactions on Computer Systems, Vol. 10, No. 1, February 1992, page 29.

By executing such a processing, even if the data in the file which is buffered in the host computer is lost due to the asynchronous writing by an abrupt power source shutdown or the like, the meta-data is not lost at all. So, the coherency of the file system structure is kept and the damage can be kept to a minimum even though the data itself is lost.

SUMMARY OF THE INVENTION

The remote copy of no guarantee to order is carried out, whereby the load which is applied to the network of the dedicated line or the like distributed between the storage apparatus systems can be reduced.

However, in the remote copy of the order no guarantee based on the prior art, it is not taken into consideration up to the coherency of the meta-data in the destination volume to keep the coherency of the file system structure, and hence there is the danger that a large amount of files would be lost.

More specifically, in the case where the data which has been written to the logical volume as the source of the copy by the file system is not transferred to the logical volume as the destination of the copy synchronously with the operation of writing the data to the file system, with respect to the directory structure of the storage apparatus system having the logical volume as the destination of the copy, the file system of the host computer may not become the-state which is intended in some cases.

Under above circumstance, the data of the storage apparatus system having the logical volume as the source of the copy is destroyed, even if the file system recovery program such as fsck runs for the storage apparatus system having the logical volume as the destination of the copy, it does not function effectively, and as a result the possibility that many files are lost is high. Because, the fsck with on the basis of the assumption that there is no contradiction between the directory structure of the storage apparatus system having the source volume and the directory structure of the storage apparatus system having the destination volume.

In the light of the foregoing, the present invention has been made in order to solve the above-mentioned problems associated with the prior art, and it is therefore an object of the present invention to provide means for even when carrying out the remote copy of the no guarantee to order, keeping the coherency of the file system structure in the destination volume, so that even when the data in the source volume is destroyed, the data in the source volume is recovered from the destination volume by maintaining the coherency of the source volume.

In order to attain the above-mentioned object, according to the present invention, there is provided a storage apparatus system having a host computer, a main storage apparatus system and a substorage apparatus system which is electrically connected to the main storage apparatus system, wherein an instruction is transmitted from the host computer to the main storage apparatus system in such a way as to maintain the data of the main storage apparatus system at a time point when the instruction is issued and the fixed data is copied to the substorage apparatus system.

In addition, the storage apparatus system may also be configured in such a way that the data which is maintained in the main storage apparatus system is transferred to the substorage system, and after completion of the transfer of the maintained data, a signal exhibiting the completion of the transfer of the data is transferred from the main storage apparatus system to the sub-storage apparatus system, so that with the reception of the signal exhibiting the completion of the data transfer as a turning point, the data is structured in the substorage apparatus system.

In addition, the step of maintaining the state of the data is to store the data in a first storage area of the main storage apparatus system until the instruction is issued from the host computer to copy, after the instruction has been issued from the host computer, the data which was stored in the first storage area at a time point of the issue of the instruction to a second storage area of the main storage apparatus, and in the step of transferring the data, the data which has been copied to the second storage area can also be transferred to the sub-storage apparatus system.

In addition, in the step of structuring the data, the maintained data which has been transferred is stored in a third storage area of the substorage apparatus system so that using the data which is held in the third storage area, the maintained data can also be structured in a fourth storage area of the substorage apparatus system.

Also, according to the present invention, there is provided a storage apparatus system including: a main storage apparatus system which has a first storage area, a second storage area and a main disk controller and which is electrically connected to a host computer; and a substorage apparatus system which has a third storage area, a fourth storage area and a sub-disk controller and which is electrically connected to the main storage apparatus system, wherein the main disk controller includes: means for recording data which has been sent from the host computer in the first storage area until an instruction is issued from the host computer; means for in response to the instruction issued from the host computer, copying the data which is recorded in the first storage area to the second storage area; and means for sending the copied data to the substorage apparatus system. Then, the sub-disk controller includes: means for receiving the data sent thereto to hold the received data in the third storage area; and means for structuring the data, which is held in the first storage area at a time point when the instruction has been issued from the host computer, in the fourth storage area using the data which is held in the third storage area.

According to another aspect of the present invention, the host computer issues a freezing instruction to the storage apparatus system as the destination of the data transfer, and the storage apparatus system as the source of the data transfer transfers the data, which is held in the storage apparatus system at a time point of the issue of the freezing instruction, and the arrangement thereof (hereinafter, referred to as "the volume image" for short, when applicable) to the storage apparatus system as the destination of the data transfer. All data transfer completion is reported which means that the volume image at a time point when the freezing instruction has been issued has already been transferred to the storage apparatus system as the destination of the data transfer.

In the storage apparatus system as the destination of the data transfer, the data of the volume image, at a time point of the issue of the freezing instruction, in the source of the data transfer is held, and when the report exhibiting the completion of the data transfer will be made next time, the volume image will be updated using the transferred data.

As a result, when the disk unit system in the source of the data transfer at an arbitrary time point has become unusable, it is possible to utilize the volume image which is held in the storage apparatus system as the destination of the data transfer.

BRIEF DESCRIPTION OF THE DRAWINGS

The above and other objects as well as advantages of the present invention will become clear by the following description of the preferred embodiments of the present invention with reference to the accompanying drawings, wherein:

FIG. 12 is a block diagram showing a configuration of a computer system to which a second embodiment of the present invention is applied;

FIG. 21 is a schematic view useful in explaining the flow of a freezing instruction in the third embodiment;

FIG. 22 is a flow chart useful in explaining the main write processing B in the third embodiment;

DESCRIPTION OF THE EMBODIMENTS

The preferred embodiments of the present invention will hereinafter be described in detail with reference to the accompanying drawings.

Figure 1:
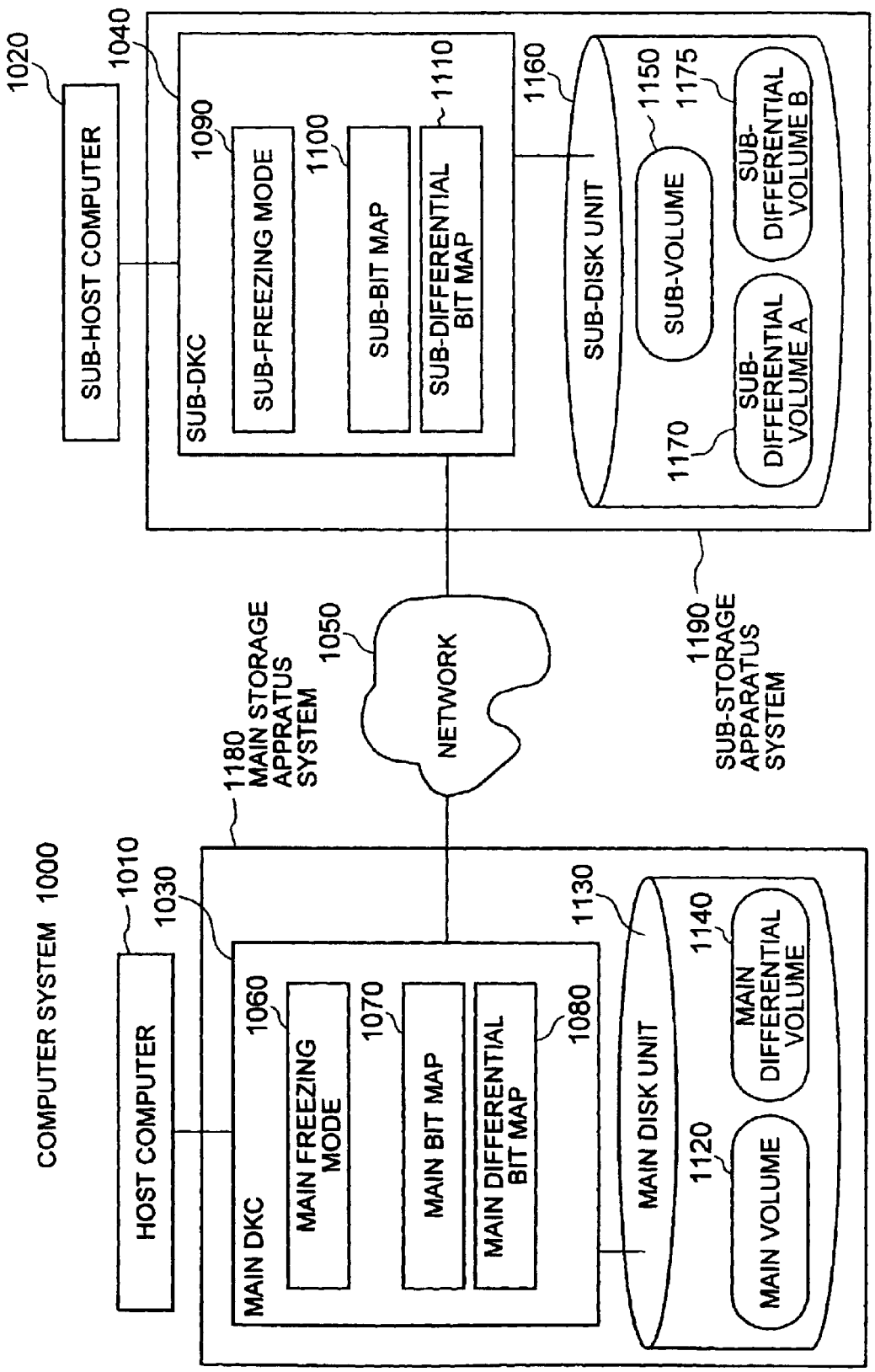
FIG. 1 is a block diagram showing a configuration of a computer system to which a first embodiment of the present invention is applied.

FIG. 1 is a block diagram showing a configuration of a first embodiment of a computer system 1000 to which the present invention is applied.

The computer system 1000 includes a host computer 1010, a main storage apparatus system 1180, a substorage apparatus system 1190 for carrying out the remote copy between the main storage apparatus system 1180 and the sub-storage apparatus system 1190, a sub-host computer 1020 and a network 1050 through which the main storage apparatus system 1180 and the sub-storage apparatus system 1190 are linked to each other.

The substorage apparatus system 1190 is used when the main storage apparatus system 1180 becomes unusable due to the calamity or the like. The sub-host computer 1020, when the host computer 1010 or the main storage apparatus system 1180 becomes unusable, takes over the processing which the host computer 1010 is expected essentially to execute, using the data in the sub-storage apparatus system 1190.

For the network 1050, it is assumed that it is the shared network such as the Internet, and the transfer rate of the data is not so high. In the present embodiment, it is assumed that the remote copy between the main storage apparatus system 1180 and the substorage apparatus system 1190 is carried out with the no guarantee to order while no heavy load is applied to the network 1050. By the way, the data transfer rate of the network 1050 may be high as well.

The main storage apparatus system 1180 includes a main disk unit 1130 in which the data transferred from the host computer 1010 is stored, and a main disk controller 1030 (hereinafter, referred to as "a DKC" for short, when applicable) for controlling the main disk unit 1130.

In the present embodiment, the host computer 1010 issues an instruction to the main storage apparatus system 1180 in such a way as to carry out "the freezing" (hereinafter, referred to as "the freezing instruction" when applicable).

The meaning of "the freezing" is to hold, for the substorage apparatus system 1190, the same volume image as that of the main storage apparatus system 1180 at a time point when the host computer 1010 has issued the instruction.

The main disk unit 1130 includes a main volume 1120 and a main differential volume 1140. Each of the main volume and the main differential volume may be either the logical volume or the physical volume. In the case of the logical volume, as in the present embodiment, a plurality of volumes may be present in the main disk unit in some cases. On the other hand, in the case of the physical volume, the main disk unit further includes a plurality of disk units each of which constitutes the physical volume. In addition, in the case as well of the logical volume, the main disk unit may be constituted by a plurality of disk units.

In the main volume 1120, there is stored the data which has been transferred from the host computer 1010 to the main storage apparatus system 1180.

In the main differential volume 1140, for a time period ranging from a time point when the main storage apparatus system 1180 has received the freezing instruction from the host computer 1010 up to a time point when the processing of the freezing has been completed (hereinafter, such a time period is referred to as "in the freezing" for short, when applicable), there is stored the data which has been transferred from the host computer 1010.

The main DKC 1030 has a main freezing mode 1060, a main bitmap 1070 and a main differential bitmap 1080 on the memory.

The main freezing mode 1060 shows whether or not the main DKC 1030 itself is executing the process of the freezing. For example, if it is judged that the main DKC 1030 itself is executing the processing in the freezing, then the mode becomes 1.

The main bitmap 1070 and the main differential bitmap 1080 have the respective bits each corresponding to a block which the main volume 1120 has.

The main bitmap 1070 shows the blocks in the main volume 1120. These blocks are the data, which are not yet transferred to the sub-DKC 1040, among the data stored in the main volume 1120 before the main storage apparatus system 1180 receives the freezing instruction from the host computer 1010.

The main differential bitmap 1080 shows the blocks which contain the data which the main disk unit 1130 has received from the host computer 1010 while the main DKC 1030 is executing the process of the freezing.

The data is stored in the log-structured postscript type file format in the main difference volume 1140. The block numbers exhibiting corresponding blocks in the main volume 1120 are also contained in the stored data.

In the case where the write data to be written to the main volume 1120 is received while the main DKC 1030 is executing the process of the freezing, the main DKC 1030 checks the main differential bitmap 1080. When the write data to be written has already been present in the main differential volume 1140, the data which was written to the main differential volume 1140 prior thereto is cancelled in such a way that a plurality of data written to the same block are not present in the main differential volume 1140.

The substorage apparatus system 1190 includes a sub-disk unit 1160 in which the data which has been remote-copied from the main storage apparatus system 1180 is stored, and a sub-DKC 1040 for controlling the sub-disk unit 1160.

The sub-disk unit 1160 includes a sub-volume 1150, a sub-differential volume A 1170 and a sub-differential volume B 1175.

In the sub-volume 1150, there is stored the volume image of the main volume 1120 at a certain time point, more specifically, at a time point when the host computer 1010 previously issued the freezing instruction to the main storage apparatus system 1180.

In the sub-differential volume A 1170, there is stored the data which was written to the main storage apparatus system 1180 on and after the host computer 1010 previously issued the freezing instruction to the main storage apparatus system 1180.

The blocks of the sub-volume 1150 and the main volume 1120 show one-to-one correspondence.

The sub-DKC 1040 includes a sub-freezing mode 1090, a sub-bitmap 1100 and a sub-differential bitmap 1110 on a memory (not shown).

The value of the sub-freezing mode 1090 becomes zero when the sub-DKC 1040 does not execute the process of the freezing, and becomes 1 or 2 when the sub-DKC 1040 is executing the process of the freezing.

The sub-bitmap 1100 and the sub-differential bitmap 1110 are constituted with the same number of bits as the number of blocks which the sub-volume A 1150 has, and 1 bit corresponds to 1 block.

The sub-bitmap 1100 shows the presence or absence of the data which is stored in the subdifferential volume A 1170.

The sub-differential bitmap 1110 shows the presence or absence of the data which is stored in the sub-differential volume B 1175.

The data is respectively stored in the log-structured type file format in the sub-differential volume A 1170 and the sub-differential volume B 1175 similarly to the main differential volume 1140. The block numbers exhibiting the corresponding blocks in the sub-volume 1150 are also contained in the data which is respectively stored therein.

The sub-DKC 1040 executes the same processing as that in the main DKC 1030 to cancel the old data in such a way that two or more data corresponding to the same block is not present in the sub-differential volume A 1170 and the sub-differential volume B 1175.

While in the present embodiment, the host computer 1010 issues the freezing instruction, alternatively, the main DKC 1030 or the sub DKC 1040 may issue the freezing instruction.

The application program which runs on the host computer 1010 issues an instruction to write data to the main storage apparatus system 1180. But, in actuality, there may be the case where the data is written to the cache or buffer memory of the host computer 1010 and hence the contents of the data stored in the main storage apparatus system 1180 become the state which the application program does not intend (i.e., the data which ought to have been written is not yet written in actual).

If under this state, the host computer 1010 has gone down due to a shutdown of the power source, and the file system recovery program such as fsck is executed for the main storage apparatus system 1180, then there is the possibility that the data which is not reflected in the main storage apparatus system 1180 may be lost.

In order to prevent the data which is not reflected in the main storage apparatus system 1180 from being lost, the main DKC 1030 or the like should not issue freely the instruction for the freezing, but the instruction for the freezing should be issued after the host computer 1010 has written all of the unreflected data on the cache or buffer memory to the main storage apparatus system 1180.

Figure 2A:
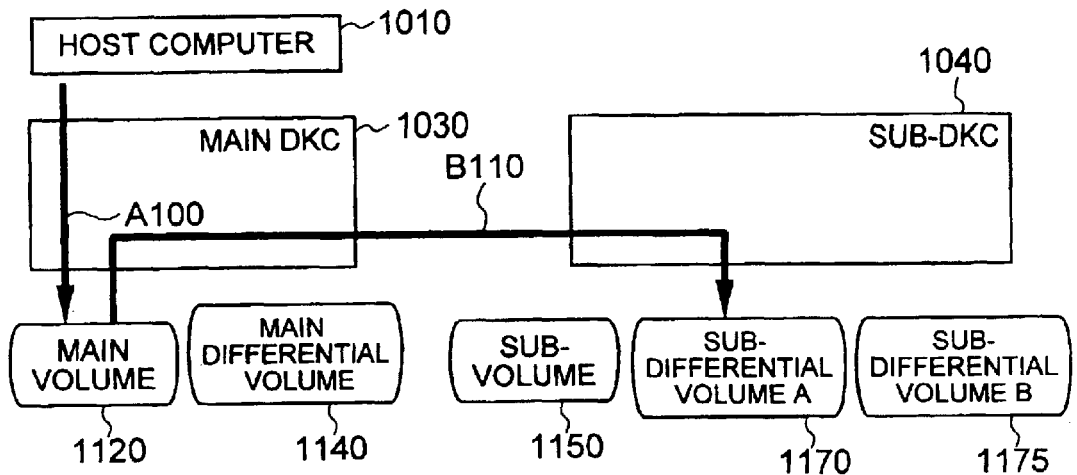
FIGS. 2A to 2C are respectively schematic views useful in explaining the flow of the data in the first embodiment.
Figure 2B:
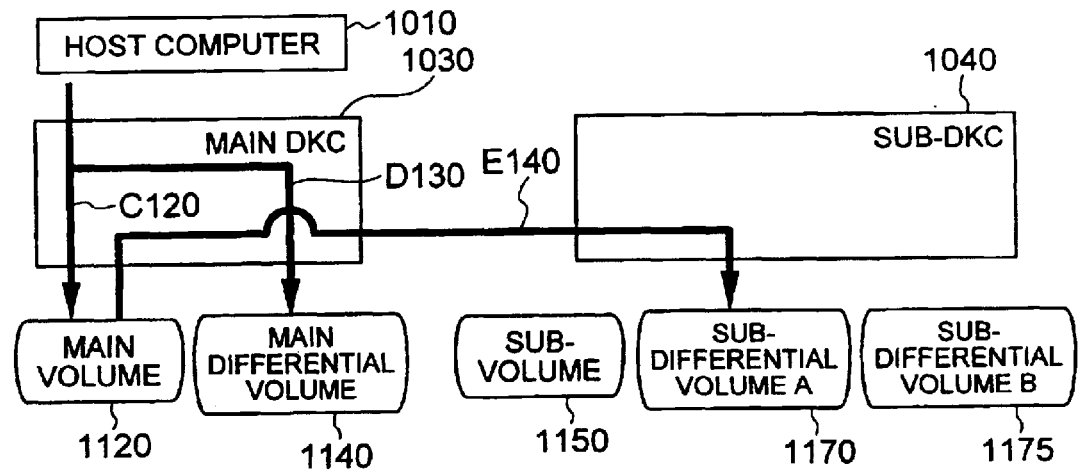
Figure 2C:
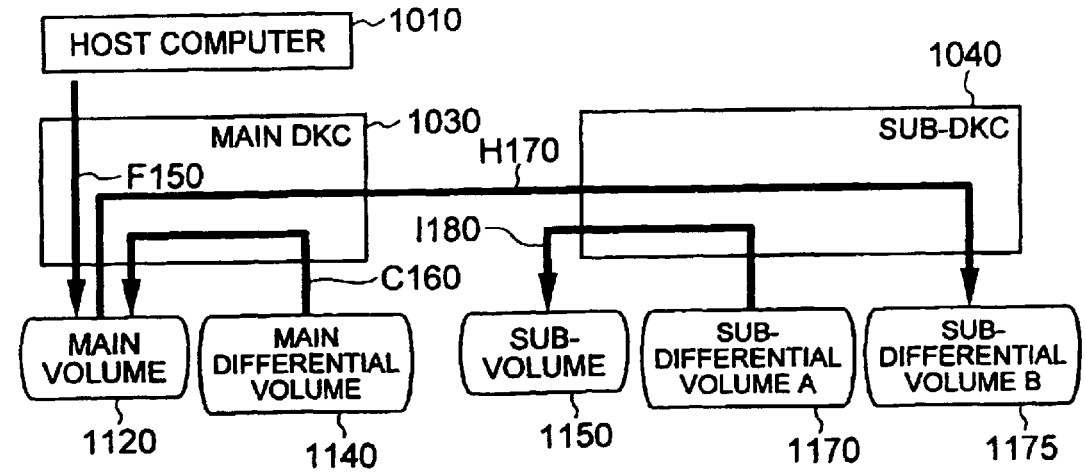

FIGS. 2A to 2C show the flow of the data in the present embodiment.

FIG. 2A is a schematic view showing the flow of the data in the state in which the host computer 1010 has not yet issued the freezing instruction, i.e., in the normal state.

The data which has been sent from the host computer 1010 is written to the main volume 1120 (indicated by an arrow A 100). The data which has been newly written to the main volume 1120 is read out from the main volume 1120 to the main DKC 1030 to be transferred to the sub-DKC 1040 to be written to the sub-differential volume 1170 (indicated by an arrow B 110).

At an arbitrary time point in FIG. 2A, in the sub-volume 1150, there is stored the same volume image as that of the main volume 1120 at a time point when the host computer 1010 issued the freezing instruction last time.

FIG. 2B is a schematic view showing the flow of the data from a time point after the host computer 1010 issues the freezing instruction up to a time point when the main DKC 1030 issues a notification command reporting that all of the data has been sent (hereinafter, referred to as "all freezing data transmission completion", when applicable) to the sub-DKC 1040.

If the data sent from the host computer 1010 is the data which is to be stored in the block of the main disk unit 1130 in which data at a time point when the host computer 1010 issued the freezing instruction has already been sent to the sub-DKC 1040, it is written to the main volume 1120 as it is (indicated by an arrow C 120). On the other hand, if the data which has been sent from the host computer 1010 is the data to be stored in the block which is still holding the data not yet sent to the sub-DKC 1040, it is written to the main differential volume 1140 (indicated by an arrow D 130).

The block containing the data which is stored in the main volume 1120 and which is not yet sent to the sub-DKC 1040 at a time point when the freezing instruction issued from the host computer 1010 is read out from the main volume 1120 to the main DKC 1030 to be transferred to the sub-DKC 1040 to be written to the sub-differential volume A 1170 (indicated by an arrow E 140).

The main DKC 1030, in accordance with the contents of the main bitmap 1070, transfers all of the difference data between the main volume 1120 and the sub-volume 1150 at a time point when the freezing instruction issued from the host computer 1010 to the sub-differential volume A 1170. After completion of all of the transfers, the main DKC 1030 informs the sub-DKC 1040 that all of the freezing data has been transferred.

At an arbitrary time point in FIG. 2B, in the sub-volume 1150, there is stored the volume image having the same contents as those of the volume image which the main volume 1120 held at a time point when the host computer 1010 issued the instruction for the freezing last time.

FIG. 2C is a schematic view showing the flow of the data ranging from a time point when the main DKC 1030 informed the sub-DKC 1040 of that all of the freezing data has been transferred up to a time point when the main DKC 1030, using the data stored in the main differential volume 1140, updates the data stored in the main volume 1120, and also the sub-DKC 1040, using the data stored in the sub-differential volume A 1170, updates the data which is stored in the sub-volume 1150.

The data which has been transferred from the host computer 1010 is written to the main volume 1120 (indicated by an arrow F 150).

The data which is stored in the main volume 1120 is updated on the basis of the data which is stored in the main differential volume 1140 (indicated by an arrow G 160). But, in the case where the block containing the data becoming an object of the update is already updated the data which has been transferred from the host computer 1010, the update of the data in the main volume 1120 corresponding to the data stored in the main differential volume 1140 is not carried out.

The data which has been transferred from the host computer 1010 to the main disk unit 1130 after the freezing instruction from the host computer 1010 is read out from the main volume 1120 to the main DKC 1030 to be sent to the sub-DKC 1040 to be stored in the sub-differential volume B 1175 (indicated by an arrow H 170).

The sub-DKC 1040 reads out the data in the sub-differential volume A 1170 to the sub-DKC 1040 to store that data in the sub-volume 1150 (indicated by an arrow I 180).

At an arbitrary time point in FIG. 2C, the data stored in the sub-volume 1150 is combined with the data stored in the sub-differential volume A 1170, whereby the volume image of the main volume 1120 at a time point when the host computer 1010 issued the freezing instruction to the main DKC 1030 that time is reproduced.

From the foregoing, in FIGS. 2A and 2B, the data of the volume image having the same contents as those of the data of the volume image of the main disk unit 1120 at a time point when the freezing instruction was issued by the host computer 1010 last time is present in the sub-volume 1150. In FIG. 2C, the data of the volume image having the same contents as those of the data of the volume image in the main disk unit 1120 at a time point when the freezing instruction was issued at that time can be reproduced by combining the data stored in the sub-volume 1150 with the data in the sub-differential volume A 1170.

In other words, in any case, the volume images which are coherent with the volume images of the main disk unit 1120 at a time point when the host computer 1010 issued the freezing instruction is prepared in the sub-disk unit 1160.

Figure 3:
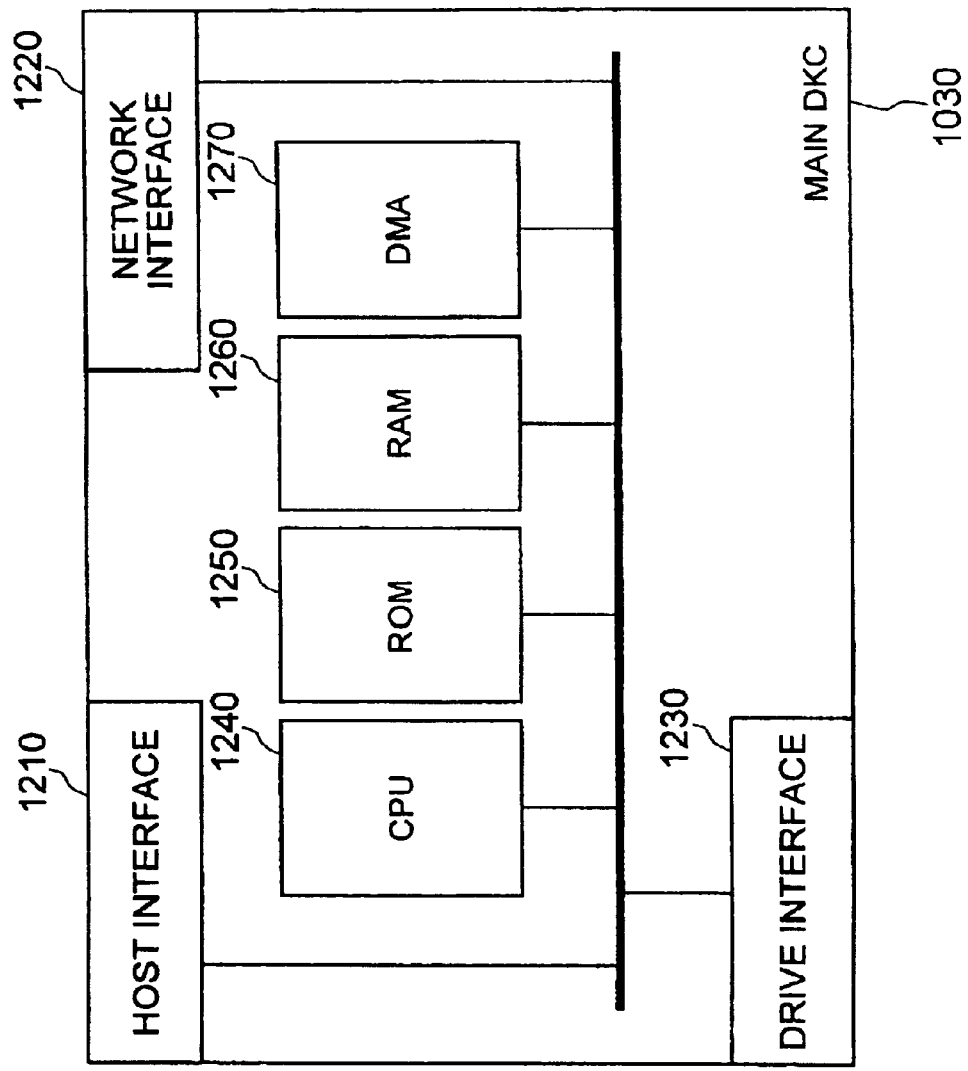
FIG. 3 is a block diagram showing an internal configuration of a DKC.

FIG. 3 is a block diagram of the main DKC 1030.

The main DKC 1030 includes a host interface 1210, a drive interface 1230, a network interface 1220, a CPU 1240, a ROM 1250, a RAM 1260, and a direct memory access controller 1270.

The program which runs on the CPU 1240 is stored in the ROM 1250.

The main freezing mode 1060, the main bitmap 1070, and the main differential bitmap 1080 are stored in the RAM 1260. The RAM is also used as the cache memory.

The CPU 1240 controls the main storage apparatus 1180. In the CPU 1240, a multitask operating system is running, so a write processing 2000, a main freezing processing 2600 and the like can be processed in parallel with one another.

The sub-DKC 1040 has also the same configuration as that of the main DKC 1030. But, in the sub-DKC 1040, the host interface 1210 is electrically connected to the sub-host computer 1020, and the drive interface 1230 is electrically connected to the sub-disk 1160. In the RAM 1260, the sub-freezing mode 1090, the sub-bitmap 1100 and the sub-differential bitmap 1110 are stored.

Figure 4:
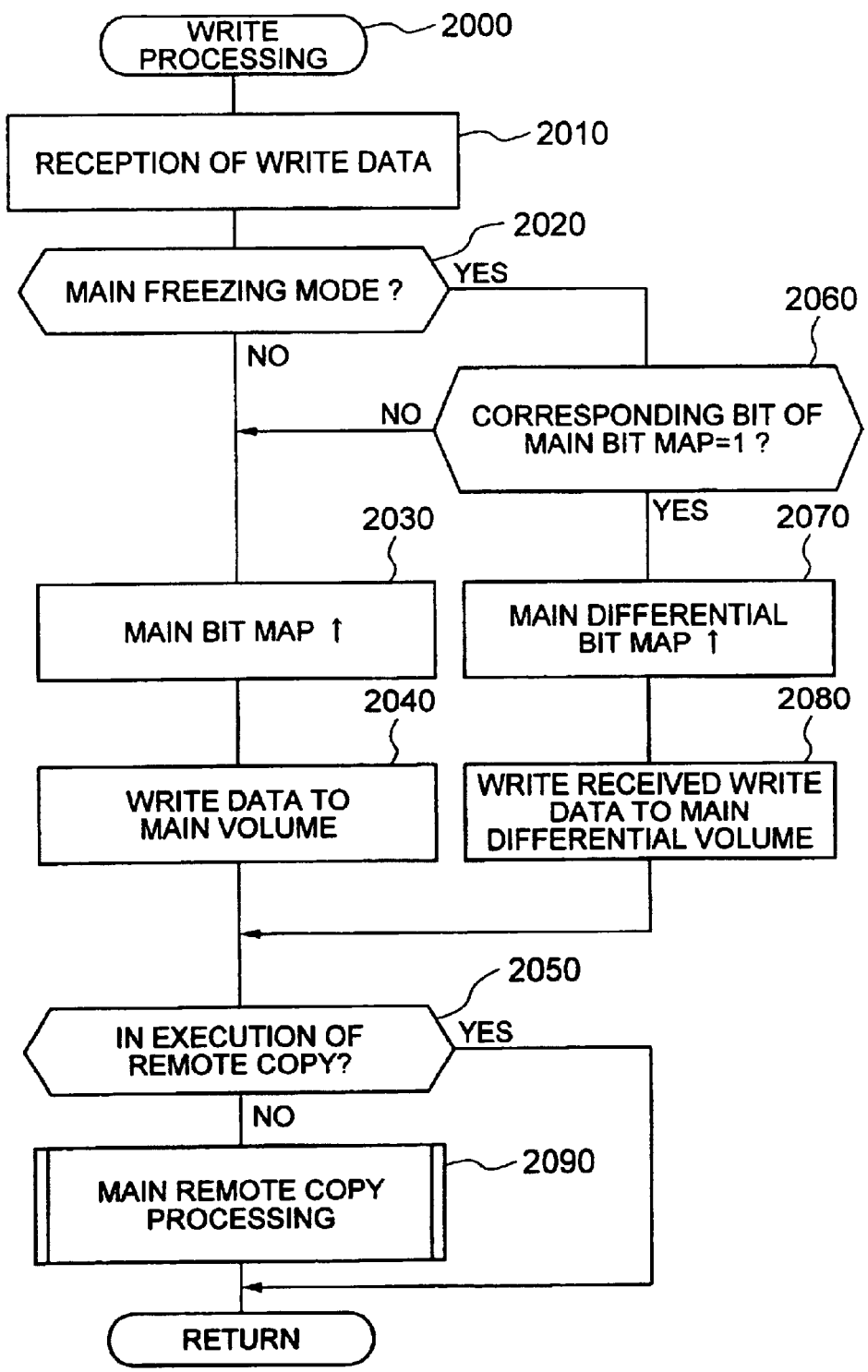
FIG. 4 is a flow chart useful in explaining the write processing in the first embodiment.

FIG. 4 is a flow chart of the write processing 2000 which is executed in the main DKC 1030 when the host computer 1010 sends the write command to write data and the data to be written (hereinafter, referred to as "the write data" for short, when applicable) to the main storage apparatus system 1180.

The main DKC 1030 receives the write data through the host interface 1210 (Step 2010) to judge whether or not the main freezing mode 1060 stored in the RAM 1260 is in the ON state (Step 2020).

If it is judged in Step 2020 that the main freezing mode 1060 is in the OFF state, then the main DKC 1030 sets to 1 the bit of the main bitmap 1070 corresponding to the block having the main volume 1120 to which the write data received by the main DKC 1030 is written (Step 2030).

The main DKC 1030 controls the main disk unit 1130 in such a way that the write data is written to the main volume 1120 (Step 2040). The main DKC 1030 itself judges whether or not a main remote copy processing 2200 is being executed (Step 2050). If it is judged in Step 2050 that the main remote copy processing 2200 is not being executed, then the remote processing is completed after the main DKC 1030 has executed the main remote copy processing 2200. On the other hand, if it is judged in Step 2050 that the main remote copy processing 2200 is being executed, then the write processing 2000 is completed.

If it is judged in Step 2020 that the main freezing mode 1060 is in the ON state, then the main DKC 1030 judges whether or not the bit of the main bitmap 1070 corresponding to the block to which the received write data is to be written is 1 (Step 2060). If it is judged in Step 2060 that the corresponding bit is zero, then the processing in Step 2030 is executed. On the other hand, if it is judged in Step 2060 that the corresponding bit is 1, then the bit of the main differential bitmap 1080 corresponding to the block in the main volume 1120 in which the received write data is to be stored is set to 1 (Step 2070).

The main DKC 1030 controls the main disk unit 1130 in such a way that the block number information in the main volume 1120 is added to the received write data, and then the write data is written to the main differential volume 1140 (Step 2080). Thereafter, the processing in Step 2050 is executed.

Figure 5:
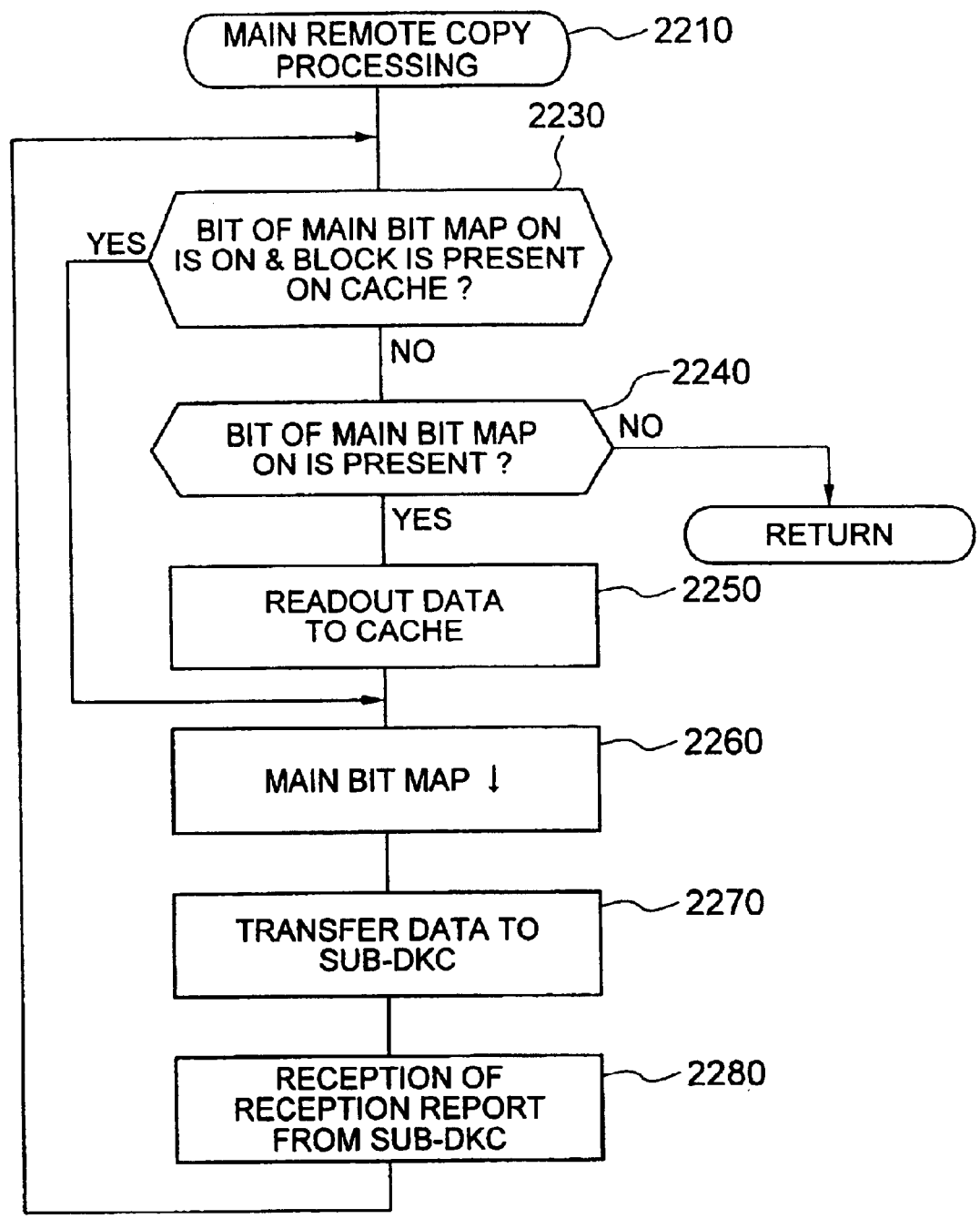
FIG. 5 is a flow chart useful in explaining the main remote copy processing in the first embodiment.

FIG. 5 is a flow chart in explaining a main remote copy processing 2200 which the main DKC 1030 executes.

The main remote copy processing 2200 is the processing which is called from the above-mentioned write processing 2000 and from the main freezing processing 2600 which will be described later.

The main DKC 1030 judges whether or not the corresponding bit of the main bitmap 1070 is 1 and also whether or not the block which contains the data stored in the RAM 1260 is present in the main volume 1120 (Step 2230). If it is judged in Step 2230 that the block corresponding to the condition is present therein, then the main DKC 1030 specifies the block of interest to execute the processing in Step 2260.

On the other hand, if it is judged in Step 2230 that the block corresponding to the condition is absent, then the main DKC 1030 judges whether or not the bit of 1 is present in the main bitmap 1070 (Step 2240). If it is judged in Step 2240 that the bit of 1 is not present in the main bitmap 1070, then the main remote copy processing 2200 is completed.

On the other hand, if it is judged in Step 2240 that the bit of 1 is present in the main bitmap 1070, then the main DKC 1030 specifies the block corresponding to the bit of 1 in the main bitmap 1070 to read out the data in the block thus specified from the main volume 1120 to store the data thus read out in the RAM 1260 (Step 2250).

The main DKC 1030 makes zero the bit of the main bitmap 1070 corresponding to the specified block (Step 2260). The main DKC 1030 transfers the data, which has been read out, to the sub-DKC 1040 through the network interface 1220 (Step 2270).

After having received the report, from the sub-DKC 1040, that the sub-DKC 1040 received the data of interest (Step 2280), the main DKC 1030 returns back to the processing in Step 2230.

Figure 6:
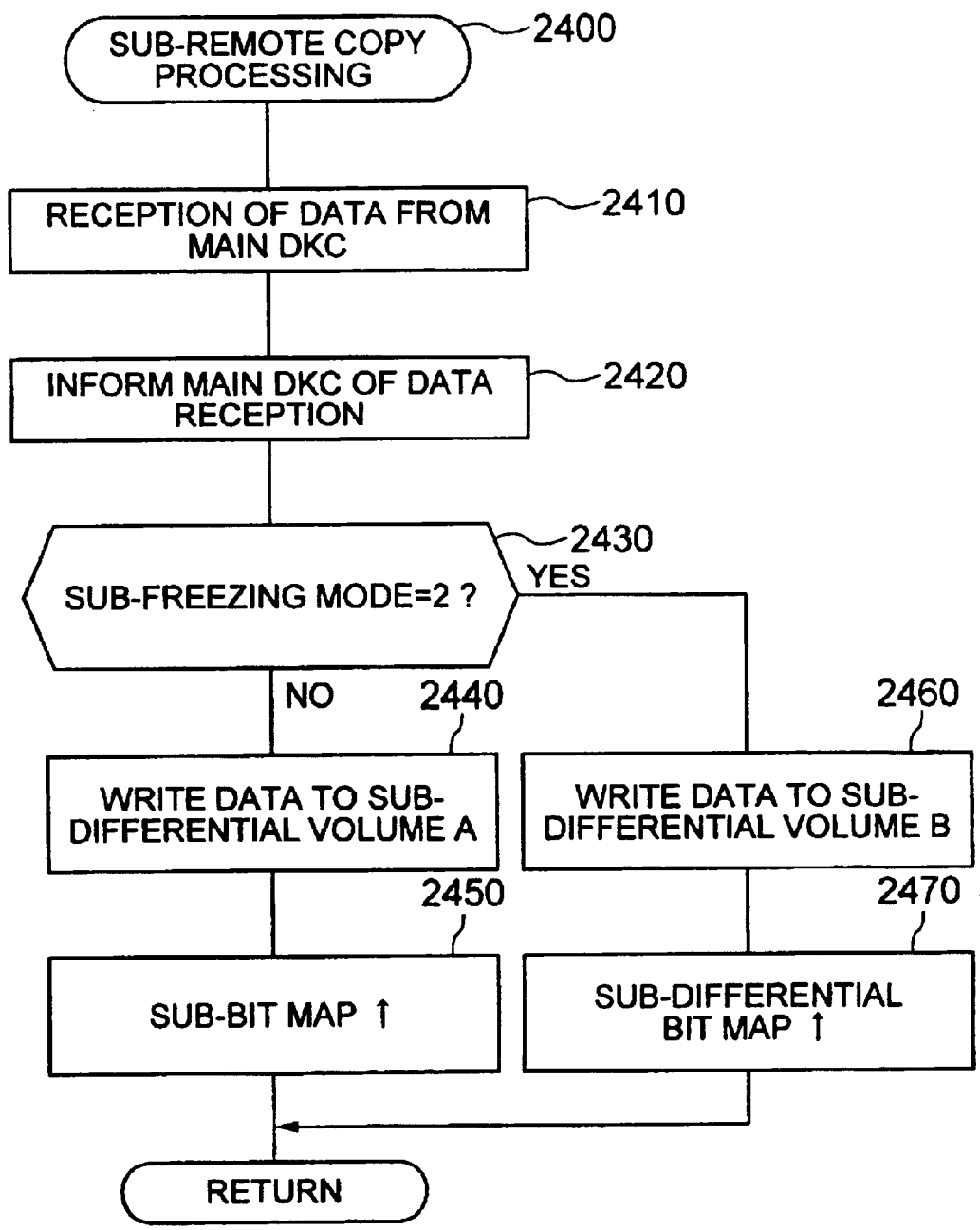
FIG. 6 is a flow chart useful in explaining the sub-remote copy processing in the first embodiment.

FIG. 6 is a flow chart useful in explaining a sub-remote copy processing 2400 which the sub-DKC 1040 executes at the time when the main DKC 1030 has sent the data to the sub-DKC 1040.

The sub-DKC 1040 receives the data which has been sent from the main DKC 1030 through the network interface 1220 (Step 2410), and then transmits the report exhibiting the reception of the data to the main DKC 1030 (Step 2420).

The sub-DKC 1040 judges whether or not the value of the sub-freezing mode 1090 stored in the RAM 1260 is 2 (Step 2430), and if it is judged in Step 2430 that the value of interest is not 2, controls the sub-disk unit 1160 in such a way that the received data is written to the sub-differential value A 1170 (Step 2440).

The sub-DKC 1040 makes 1 the bit of the sub-bitmap 1100 corresponding to the block having the written data to complete the sub-remote processing 2400 (Step 2450).

On the other hand, if it is judged in Step 2430 that the value of the sub-freezing mode 1090 is 2, then the sub-DKC 1040 controls the sub-disk unit 1160 in such a way that the received data is written to the sub-differential value B 1175 (Step 2460).

The sub-DKC 1040 sets to 1 the bit of the sub-differential bitmap 1110 corresponding to the block having the written data to complete the sub-remote copy processing 2400 (Step 2470).

Figure 7:
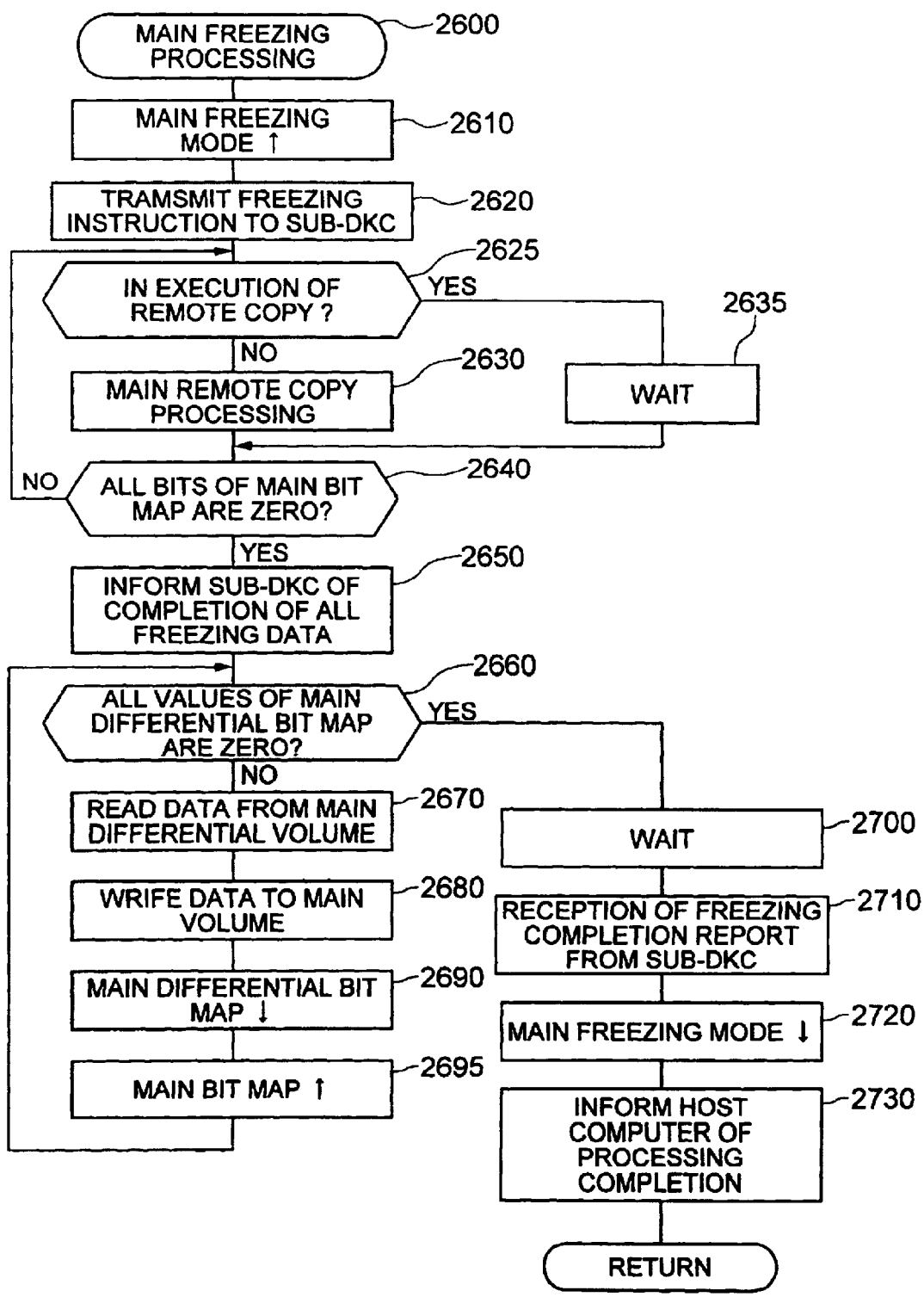
FIG. 7 is a flow chart useful in explaining the main freezing processing in the first embodiment.

FIG. 7 is a flow chart useful in explaining a main freezing processing 2600 which the main DKC 1030 executes at the time when the host computer has issued the freezing instruction.

After having received the freezing instruction from the host computer 1010 through the host interface 1210, the main DKC 1030 turns ON the main freezing mode 1060 which is stored in the RAM 1260 (Step 2610).

The main DKC 1030 transmits the freezing instruction to the sub-DKC 1040 (Step 2620). The main DKC 1030 judges whether or not the main DKC 1030 itself is executing the remote copy processing 2200 (step 2625).

If it is judged in Step 2625 that the main DKC 1030 itself is executing the remote copy processing 2200, then the main DKC 1030, after having carried out the step of waiting for some time (e.g., several milliseconds) (Step 2635), executes the processing in Step 2640.

On the other hand, if it is judged in Step 2625 that the main DKC 1030 itself is not executing the remote copy processing 2200, then the main remote copy processing 2200 is executed (Step 2630) to execute the processing in Step 2640.

In Step 2640, the main DKC 1030 judges whether or not all of the bits of the main bitmap 1070 are zero. If the bit exhibiting 1 is present in the main bitmap 1070, then since the data to be sent to the sub-DKC 1040 still remains in the main disk unit 1130, the main DKC 1030 executes again the processings after Step 2625 until all of the bits of the main bitmap 1070 have become zero.

On the other hand, if it is judged in Step 2640 that all of the bits of the main bitmap 1070 are zero, then the main DKC 1030 transmits the information, that the freezing data has already been transmitted, to the sub-DKC 1040 (Step 2650).

The main DKC 1030 judges whether or not all of the values of the main differential bitmap 1080 are zero (Step 2660).

If it is judged in Step 2660 that all of the values of the main differential bitmap 1080 are not zero, then the main DKC 1030 controls the main disk unit 1130 in such a way that the data of the block, in which the bit in the main differential bitmap 1080 is 1, is read out from the main differential volume 1140 (Step 2670) to be written to the block to which the main volume 1120 corresponds (Step 2680).

The main DKC 1030 sets to zero the bit of the main differential bitmap 1080 corresponding to the block containing the written data (Step 2690), while it sets to 1 the corresponding bit of the main bitmap 1070 to return back to the processing in Step 2660 (Step 2695).

On the other hand, if it is judged in Step 2660 that all of the values of the main differential bitmap 1080 are zero, then the main DKC 1030 waits for the completion report from the sub-DKC 1040 (Step 2700). After having received the completion report transmitted from the sub-DKC 1040 (Step 2710), the main DKC 1030 turns OFF the main freezing mode 1060 which is stored in the RAM 1260 (Step 2720) to transmit a signal exhibiting the freezing processing completion report to the host computer 1010 to complete the main freezing processing 2600 (Step 2730).

Upon completion of the processing in Step 2650, the processing in Step 2700 may be executed, and the update processing for the main differential volume (Steps 2660 to 2695) may be executed after completion of the main freezing processing.

Figure 8:
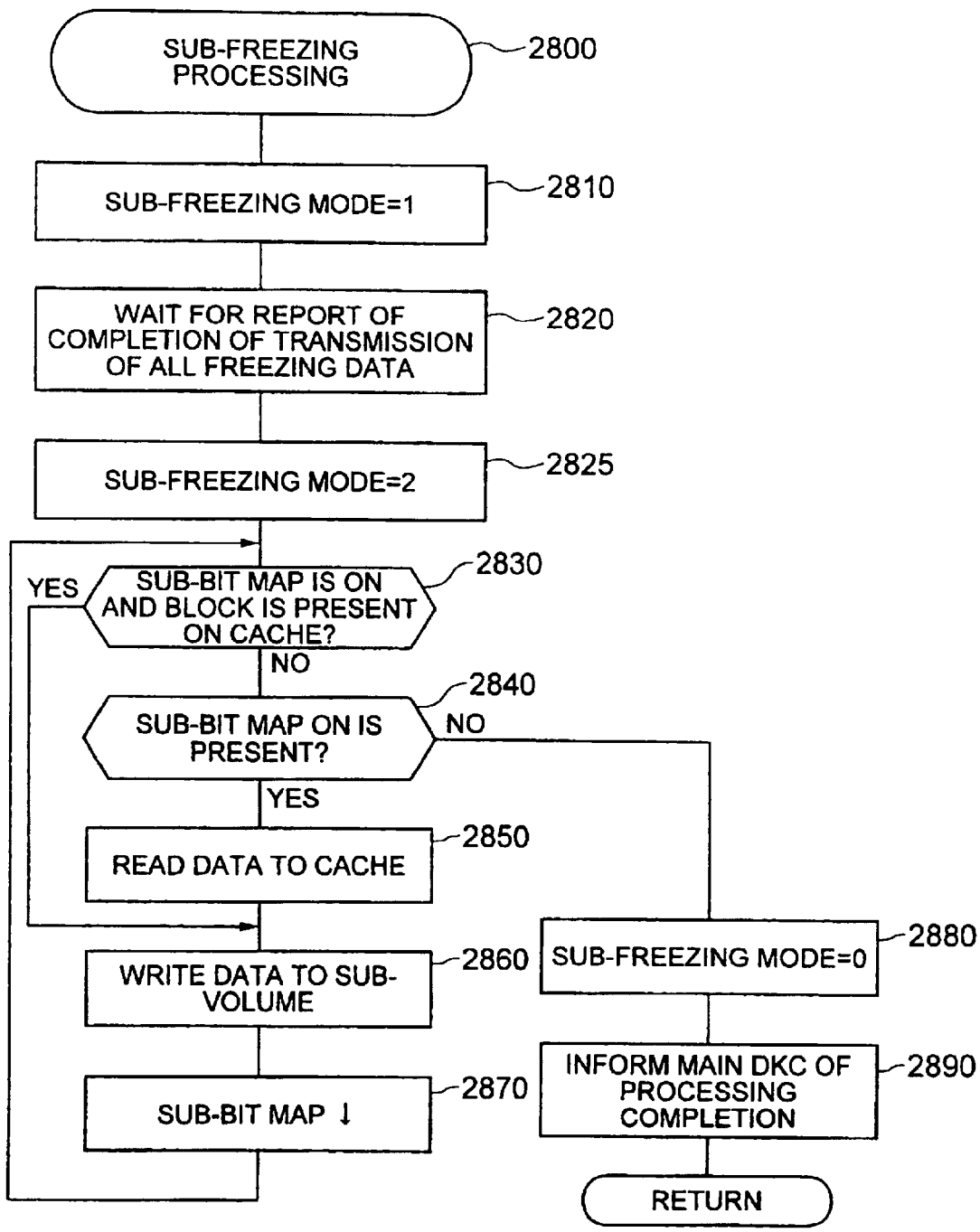
FIG. 8 is a flow chart useful in explaining the sub-freezing processing in the first embodiment.

FIG. 8 is a flow chart useful in explaining a sub-freezing processing 2800 which the sub-DKC 1040 executes at the time when the main DKC 1030 has issued the freezing instruction to the sub-DKC 1040.

After having received the freezing instruction command from the main DKC 1030, the sub-DKC 1040 sets to 1 the sub-freezing mode 1090 which is stored in the RAM 1260 (Step 2810) to wait for the report, exhibiting that all of the freezing data has already been transmitted, from the main DKC 1030 (Step 2920).

After having received the report exhibiting the completion of the transmission of all of the freezing data from the main DKC 1030, the sub-DKC 1040 sets to 2 the sub-freezing mode 1090 (Step 2825).

The sub-DKC 1040 judges whether or not the corresponding bit of the sub-bitmap 1100 stored in the RAM 1260 is 1 and also whether or not the corresponding block having the data is present on the RAM 1260 (Step 2830).

If it is judged in Step 2830 that the corresponding block is present on the RAM 1260, then the sub-DKC 1040 executes the processing in Step 2860. On the other hand, if it is judged in Step 2830 that the corresponding block is not present on the RAM 1260, then it is judged whether or not the block in which the corresponding bit of the sub-bitmap 1100 is 1 is present (Step 2840).

If it is judged in Step 2840 that the block in which the corresponding bit of the sub-bitmap 1100 is 1 is present, then the sub-DKC 1040 reads out the data corresponding to the bit as 1 from the sub-differential volume A 1170 to the RAM 1260 (Step 2850) to write the data of interest to the block of the sub-volume 1150 corresponding to the data read to the RAM 1260 (step 2860).

The sub-DKC 1040 sets to zero the bit of the sub-bitmap 1100 corresponding to the data which has already been written (Step 2870) to return back to the processing in Step 2830.

On the other hand, if it is judged in Step 2840 that the block in which the corresponding bit of the sub-bitmap 1100 is 1 is absent, then the sub-DKC 1040 sets to zero the sub-freezing mode 1090 (Step 2880) to transmit the report exhibiting the completion of the sub-freezing processing to the main DKC 1030 (Step 2890) to complete the sub-freezing processing 2800.

Figure 9:
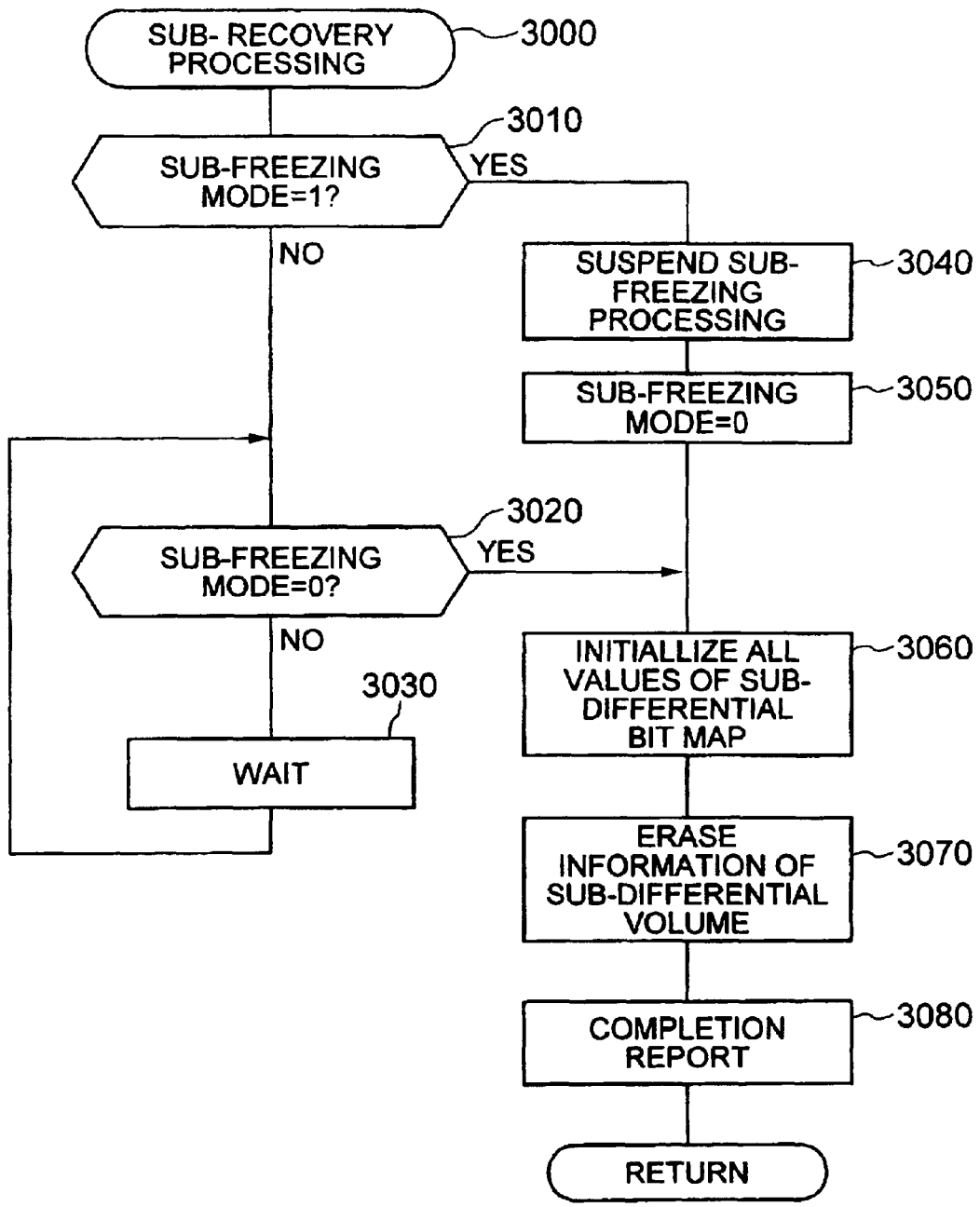
FIG. 9 is a flow chart useful in explaining the sub-recovery processing in the first embodiment.

FIG. 9 is a flow chart useful in explaining a sub-recovery processing 3000 which the sub-DKC 1040 executes in accordance with the instruction from the sub-host computer 1020 in the case where the host computer 1010 and the main storage apparatus 1180 become both unusable at all due to a disaster or the like.

After having received the instruction issued from the sub-host computer 1020, the sub-DKC 1040 judges whether or not the sub-freezing mode 1090 is 1 (Step 3010). If it is judged in Step 1040 that the sub-freezing mode 1090 is 1, then the sub-DKC 1040 suspends the sub-freezing processing 2800 which the sub-DKC 1040 itself is executing (Step 3040) to set to zero the sub-freezing mode (Step 3050).

The sub-DKC 1040 initiallizes all of the values of the sub-differential bitmap to zero (Step 3060) to erase the information which the subdifferential volume A 1170 and the sub-differential volume B 1175 have (Step 3070).

The sub-DKC 1040 transmits the completion report to the sub-host computer 1020 (Step 3080) to complete the sub-recovery processing 3000.

On the other hand, if it is judged in Step 3010 that the sub-freezing mode 1090 is not 1, then the sub-DKC 1040 judges whether or not the sub-freezing mode 1090 is zero (Step 3020). If it is judged in Step 3020 that the sub-freezing mode 1090 is zero, then the sub-DKC 1040 executes the processing in Step 3060. On the other hand, if it is judged in Step 3020 that the sub-freezing mode 1090 is not zero, then the sub-DKC 1040 waits for the sub-freezing mode 1090 to become zero to execute the processing in Step 3020 (Step 3030).

By executing the sub-recovery processing 3000, the volume image of the main volume 1120 at a time point when the freezing instruction was issued from the host computer 1010 to the main DKC 1030 last time or this time is copied to the sub-volume 1150. Then, the sub-host computer 1020 can use freely the copied volume image.

Figure 10:
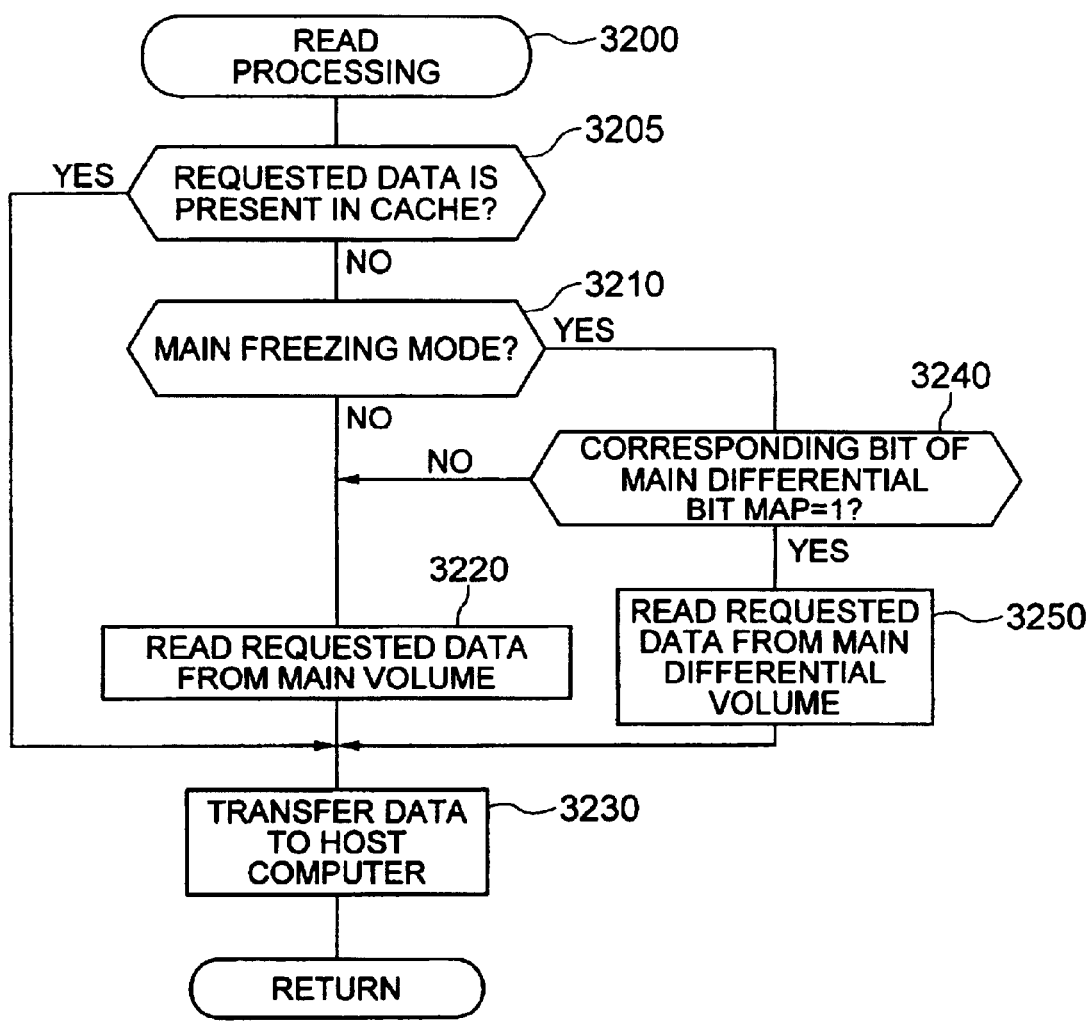
FIG. 10 is a flow chart useful in explaining the reading processing in the first embodiment.

FIG. 10 is a flow chart useful in explaining a read processing 3200 which the main DKC 1030 executes at the time when the host computer 1010 has issued the read command to read the data to the main storage apparatus system 1180.

After having received the read command issued from the host computer 1010, the main DKC 1030 judges whether or not the data which has been requested from the host computer 1010 is present in the RAM 1260 (Step 3205).

If it is judged in Step 3205 that the requested data is not present in the RAM 1260, then the main DKC 1030 checks the main freezing mode (Step 3210). If it is judged in Step 3210 that the main freezing mode 1060 is OFF, then the main DKC 1030 reads out the requested data from the main volume 1130 (Step 3220) to transfer the data of interest to the host computer 1010 to complete the read processing 3200 (Step 3230).

On the other hand, if it is judged in Step 3210 that the main freezing mode 1060 is ON, then the main DKC 1030 judges whether or not the bit of the main differential bitmap 1080 corresponding to the data requested from the host computer 1010 is 1 (Step 3240).

If it is judged in Step 3240 that the corresponding bit is zero, then the main DKC 1030 executes the processing in Step 3220. On the other hand, if it is judged in Step 3240 that the corresponding bit is 1, then the main DKC 1030 finds out the data, which has been required from the host computer 1010, from the main differential volume 1140 to read out the data thus found out to execute the processing in Step 3230 (Step 3250).

On the other hand, if it is judged in Step 3205 that the requested data is present in the RAM 1260, then the main DKC 1030 executes the processing in Step 3230.

Figure 11:
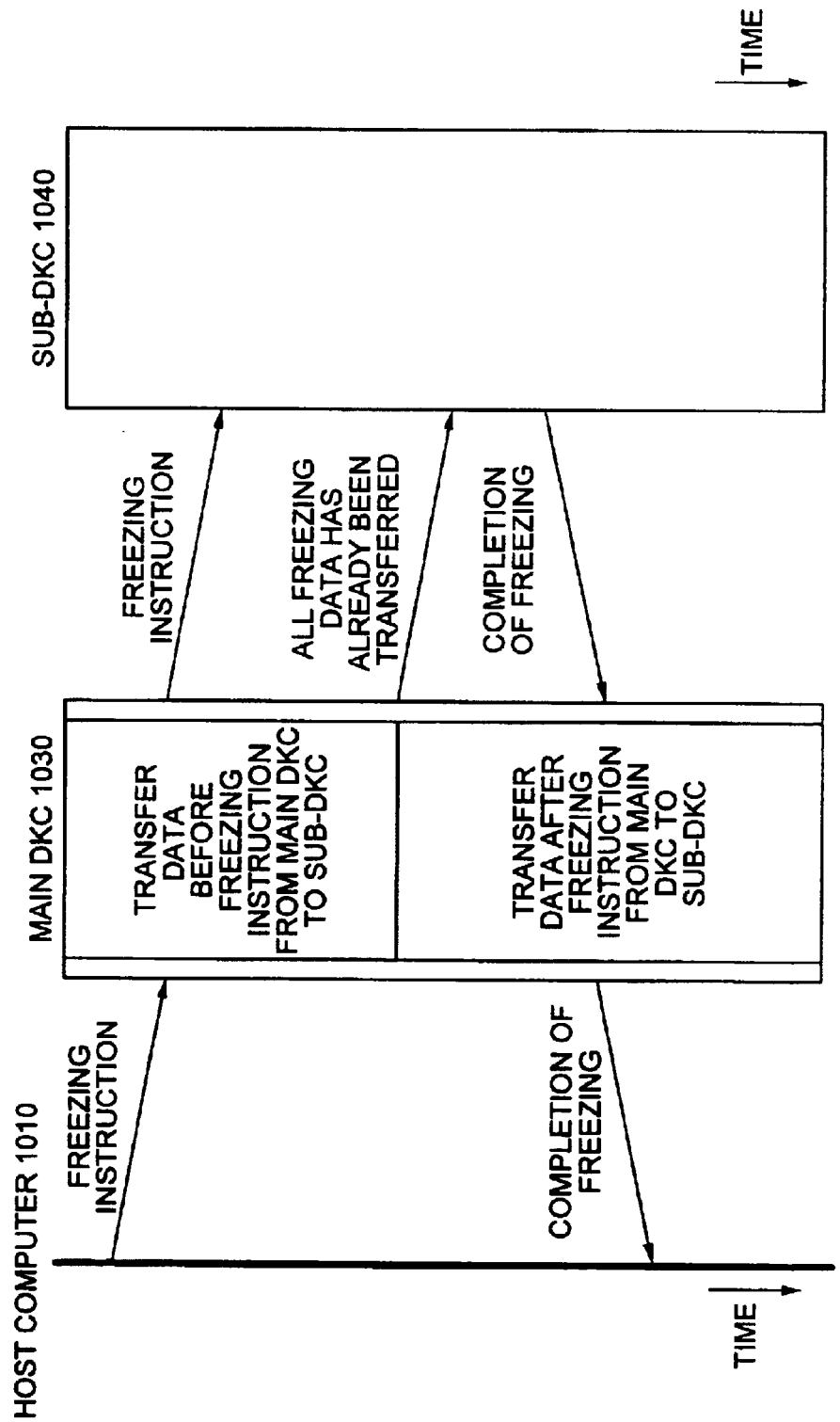
FIG. 11 is a schematic view useful in explaining the flow of the freezing instruction corresponding to the first embodiment.

FIG. 11 is a schematic view useful in explaining the transmission and the reception of the freezing instruction between the apparatuses included in the host computer 1000.

In FIG. 11, the vertical axis represents the time base. Thus, it is meant that the time elapses as the position on the drawing is located more downwardly.

The host computer 1010 issues the freezing instruction to the main DKC 1030, and then in response to the freezing instruction issued thereto, the main DKC 1030 issues the freezing instruction to the sub-DKC 1040.

After having transferred the volume image of the main volume 1120 at a time point of the reception of the freezing instruction to the sub-DKC 1040, the main DKC 1030 transmits the report showing the completion of the transfer of all of the freezing data to the sub-DKC 1040.

The sub-DKC 1040 reflects the data of the main volume 1120 at a time point of the issue of the freezing instruction to the sub-volume 1150, and after completion of the reflection of the data, informs the main DKC 1030 of the completion of the freezing. In response thereto, the main DKC 1030 informs the host computer 1010 of the completion of the freezing.

By adopting the configuration of the present embodiment, the data which is held in the main disk unit at a time point when the freezing instruction is issued from the host computer 1010 can be held in the sub-disk unit, and hence even when the data is destroyed, the loss of the data can be suppressed to a minimum.

In other words, the sub-storage apparatus system 1190 holds the data at a time point of the issue of the freezing instruction and at the same time, holds as the differential data the data which was written on and after that time point. This freezing is carried out at periodic intervals, whereby when the data of the main storage apparatus system 1180 is not able to be used due to for some cause or other, all of the data at a time point when it was frozen last time can be obtained from the sub-storage apparatus system 1190.

In this connection, while in the present embodiment, the description has been given on the assumption that a plurality of volumes are present inside of the main disk unit 1130, the present invention is not intended to be limited thereto. That is, a plurality of disk units may be present in the main storage apparatus system 1180, and each of the disk units may take the function of the volume on itself. This is also applied to the sub-disk unit 1160.

FIG. 12 is a block diagram showing a configuration of a second embodiment of the computer system 1000 to which the present invention is applied.

A point of difference of the present embodiment from the first embodiment is that the copy of the coherent volume image at the time when the freezing instruction has been issued from the host computer 1010 is generated in the main disk unit 1130 once, and the data is transferred from the volume thus generated to the sub-DKC.

The present embodiment is also different from the first embodiment in that two volumes are prepared for the sub-storage apparatus system, and one of them is made the volume which is used in order to generate the coherent volume.

The description will hereinafter be given with respect to points of difference from the computer system 1000 of the first embodiment. The parts which will not be described here have the same configurations as those of the first embodiment, and hence are designated with the same reference numerals.

A main disk unit 1130' includes a main main-volume 1300 and a main sub-volume 1310.

In the main main-volume 1300, there is stored the data which has been transferred from the host computer 1010. The main sub-volume 1310 is used when copying the volume image of the main main-volume 1300 at a time point when the freezing instruction was issued. The blocks which the main main-volume 1300 and the main sub-volume 1310 have, respectively, show one-to-one correspondence.

The main DKC 1030' has a main bitmap A 1340, a main bitmap B 1350, and a main bitmap C 1360 all of which are contained in the RAM 1260.

The main bitmap A 1340, when the contained bit is 1, with respect to the block corresponding to that bit, shows that the contents of the data which is stored in the main main-volume 1300 are different from those of the data which is stored in the main sub-volume 1310.

While the main bitmap B 1350 also shows the difference between the main main-volume 1300 and the main sub-volume 1310, only the bit corresponding to the block in which after the freezing instruction has been transmitted from the host computer 1010, the data is written to the main main-volume 1300 becomes 1.

The main bitmap C 1360 shows that there is the difference in the contents between the main sub-volume 1310 and a sub-main-volume 1320.

A sub-disk unit 1160' includes the sub-main-volume 1320 and a sub-sub-volume 1330.

To the sub-main-volume 1320, there is written the data which has been transferred from the main DKC 1030'. In the sub-sub-volume 1330, there is built the volume image of the main main-volume 1300 at a time point when the freezing processing was executed last time.

A sub-DKC 1040' has a sub-bitmap A 1370 showing the difference between the sub-main-volume 1320 and the sub-sub-volume 1330. Then, the sub-bitmap A 1370 is contained in the RAM 1260. In the present embodiment, the sub-freezing mode 1090 is not used.

FIGS. 13A to 13D are respectively schematic views showing the flow of the data corresponding to the present embodiment.

Figure 13A:
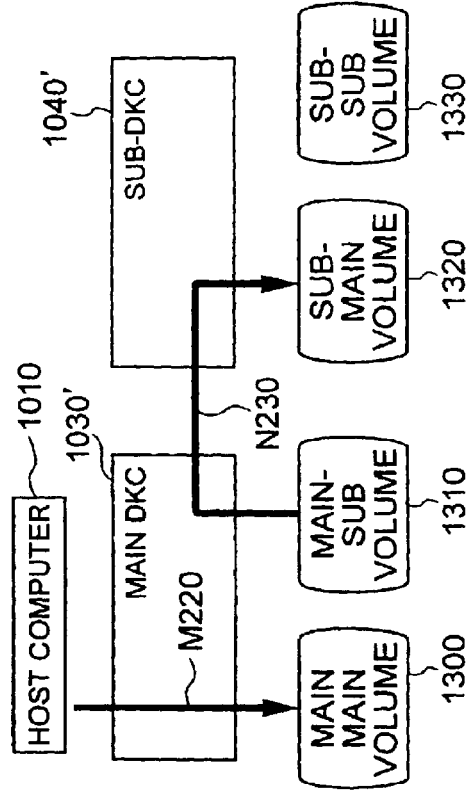
FIGS. 13A to 13D are respectively schematic views useful in explaining the flow of the data in the second embodiment.

In FIG. 13A, there is shown the flow of the data in the case where the host computer 1010 does not issue the freezing instruction.

The data which has been transferred from the host computer 1010 is written to the main main-volume 1300 (indicated by an arrow J 190).

Then, it is assumed that in the sub-sub-volume 1330, there is stored the data of the volume image of the main main-volume 1300 at a time point when the host computer 1010 issued the freezing instruction last time.

Figure 13C:
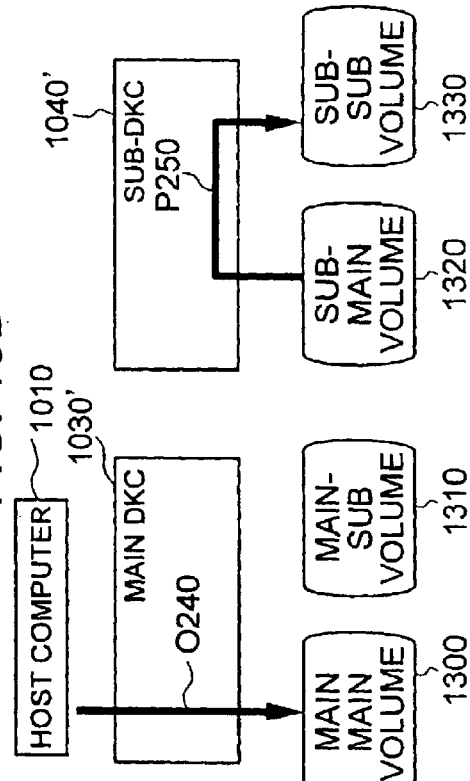
Figure 13B:
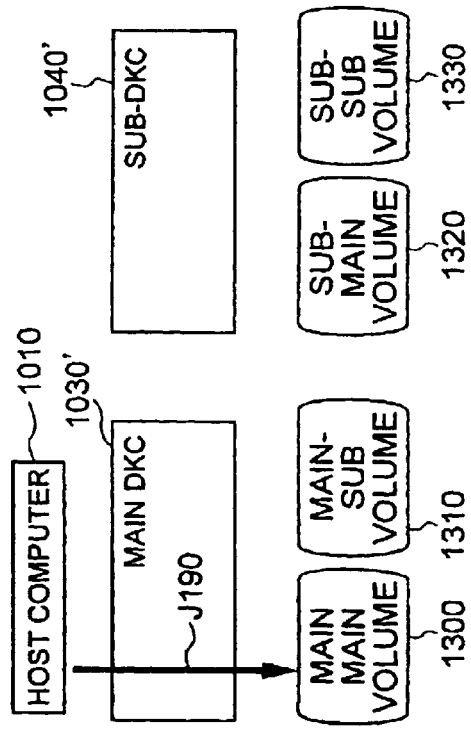

In FIG. 13B, there is shown the flow of the data for a time period ranging from a time point when a host computer 1010 has issued the freezing instruction up to a time point when the main storage apparatus system 1180 generates, in the main sub-volume 1310, the copy of the volume image of the main main-volume 1300 at a time point when the main storage apparatus system 1180 issued the freezing instruction.

The main disk unit 1130 copies the data from the main main-volume 1300 to the main sub-volume 1310 (indicated by an arrow L 210).

While the data which the main DKC 1030' has received is written to the main main-volume 1300 (indicated by an arrow K 200), in the case of writing of the data to the block in which the copy to the main sub-volume 1310 is not yet carried out, after completion of the processing of copying the data indicated by the arrow L 210, the data is written to the main main-volume 1300.

In FIG. 13C, there is shown the flow of the data for a time period ranging from a time point when the volume image of the main main-volume 1300 at a point when the host computer 1010 issued the freezing instruction has been generated in the main sub-volume 1310 up to a time point when the volume image generated in the main sub-volume 1310 is generated in the sub-main-volume 1320 which the sub-DKC 1040' manages.

The data which has been transferred from the host computer 1010 is written to the main main-volume 1300 (indicated by the arrow M 220). The data of the main sub-volume 1310 is read out to the main DKC 1030' to be transferred to the sub-DKC 1040' to be written to the sub-main-volume 1320 (indicated by the arrow N 230).

Figure 13D:
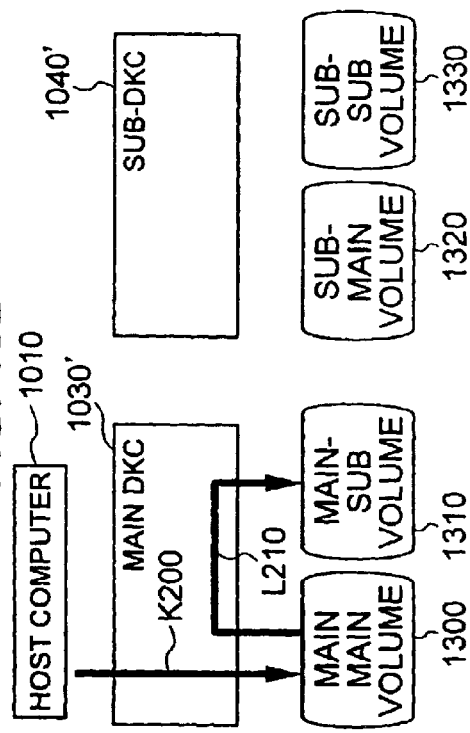

In FIG. 13D, there is shown the flow of the data for a time period ranging from a time point when the volume image of the main main-volume 1300 at a time point when the host computer 1010 issued the freezing instruction to the sub-main-volume 1320 has been generated up to a time point when the volume image thus generated is copied to the sub-sub-volume 1330.

The data which has been transferred from the host computer 1010 is written to the main main-volume 1300 (indicated by an arrow O 240).

The sub-DKC 1040' controls the copy of the data from the sub-main-volume 1320 to the sub-sub-volume 1330 (indicated by an arrow P 250).

In the present embodiment, the copy of the data for duplicating the volume image of the main main-volume 1300 is carried out in such a way that of the data which is stored in the source volume and in the destination volume, only the differential data is subjected to the differential copy.

In FIGS. 13A, 13B and 13C, the sub-sub-volume 1330 holds the volume image of the main main-volume 1300 at a time point when the host computer 1010 issued the freezing instruction last time.

In FIG. 13D, the sub-main-volume 1320 holds the volume image of the main main-volume 1300 at a time point when the host computer 1010 has issued the freezing instruction this time.

Therefore, volume image of the main main-volume 1300 at a time point when the host computer 1010 issued the freezing instruction will be held in any case.

Figure 14:
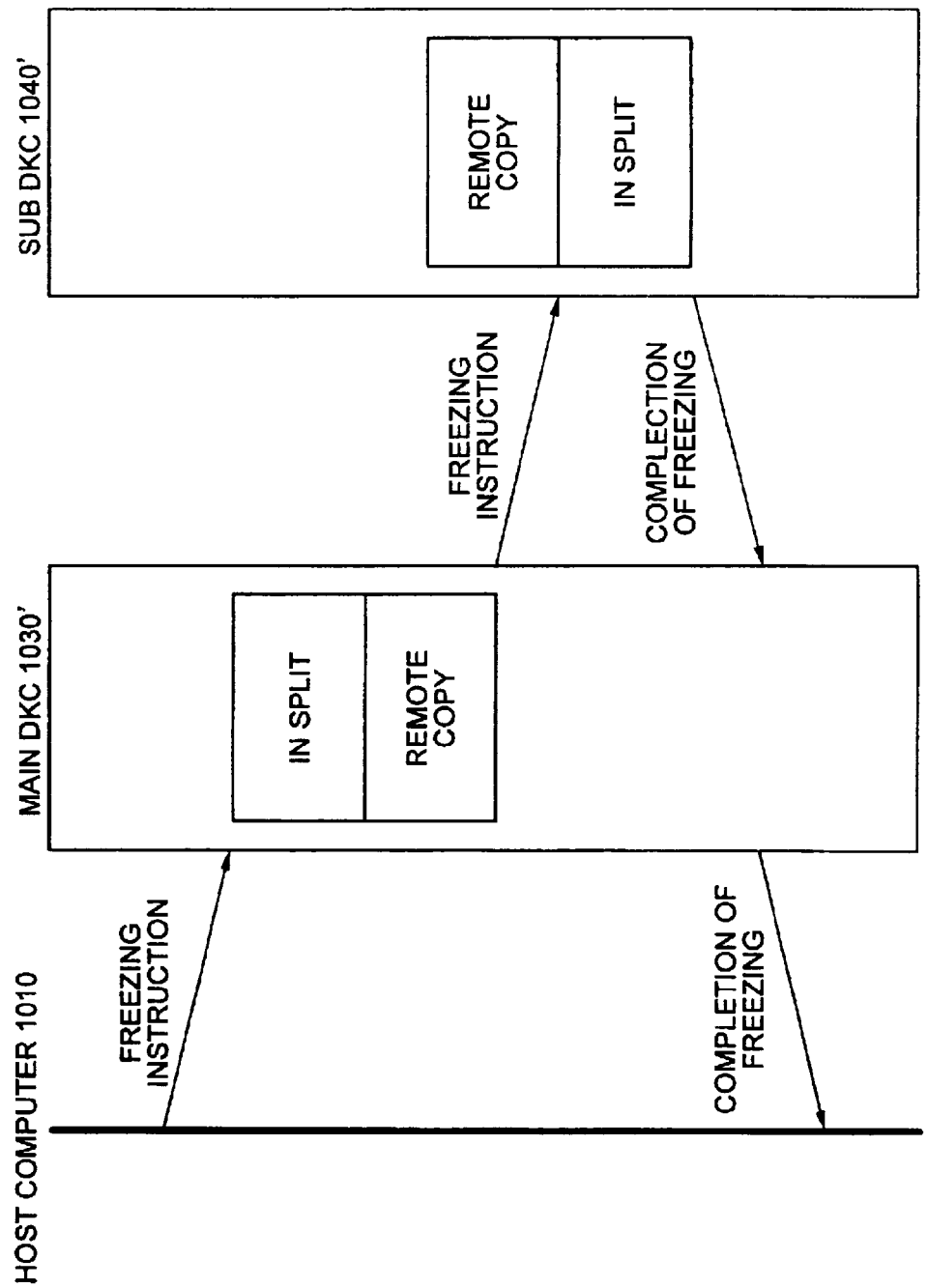
FIG. 14 is a schematic view useful in explaining the flow of a freezing instruction in the second embodiment.

FIG. 14 is a schematic view useful in explaining the flow of the freezing instruction in the computer system 1000 of the present embodiment. In the figure, the vertical direction represents the time base. Thus, it is meant that the time elapses as the position on the drawing is located more downwardly.

The host computer 1010 issues the freezing instruction to the main DKC 1030'. In response to the freezing instruction issued thereto, the main DKC 1030' differential-copies (hereinafter, the differential copy will be referred to as "the split", when applicable) all of the data, which is stored in the main main-volume 1300 at a time point when the freezing instruction was issued, to the main sub-volume 1310. After completion of the differential copy, the main DKC 1030' reads out the data of the main sub-volume 1310 to transmit the data thus read out to the sub-DKC 1040'. Then, the sub-DKC 1040' writes the data which has been received from the main DKC 1030' to the sub-main volume 1320.

The main DKC 1030' issues the freezing instruction to the sub-DKC 1040'. After having received the freezing instruction, the sub-DKC 1040' splits the volume image of the sub-main volume 1320 to the sub-sub-volume 1330. After completion of the split, the sub-DKC 1040' transmits the report exhibiting the completion of the freezing to the main DKC 1030'. After having received this report, the main DKC 1030' informs the host computer 1010 of the completion of the freezing.

Figure 15:
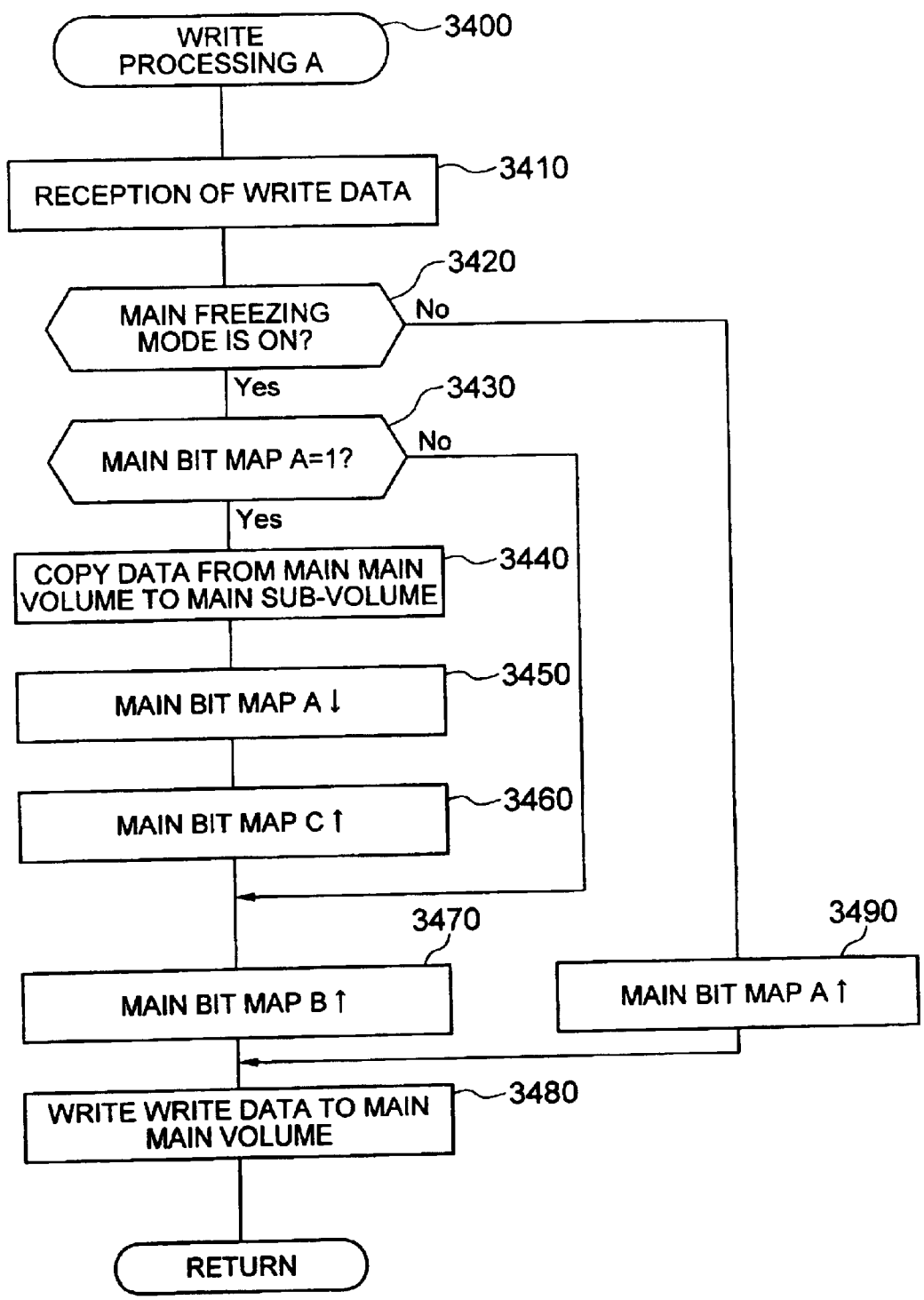
FIG. 15 is a flow chart useful in explaining the write processing A in the second embodiment.

FIG. 15 is a flow chart useful in explaining a write processing A 3400 which the main DKC 1030' executes when the host computer 1010 transmits the data to the main storage apparatus system 1180.

The main DKC 1030' receives the write data from the host computer 1010 (Step 3410) to judge whether or not the main freezing mode 1060 is in the ON state (Step 3420).

If it is judged in Step 3420 that the main freezing mode 1060 is in the ON state, then the main DKC 1030' judges whether or not the bit of the main bitmap A 1340 corresponding to the block in which the transferred data is stored is 1 (Step 3430).

If it is judged in Step 3420 that the bit of the main bitmap A 1340 is zero, then the main DKC 1030' executes the processing in Step 3470. On the other hand, if it is judged in Step 3420 that the bit of the main bitmap A 1340 is 1, then the main DKC 1030' controls the main disk unit 1130 in such a way as to copy the data stored in the block corresponding to the bit of 1 from the main main volume 1300 to the main sub-volume 1310 (Step 3440).

After completion of the copy, the main DKC 1030' sets to zero the corresponding bit of the main bitmap A 1340 (Step 3450) and also sets to 1 the corresponding bit of the main bitmap C 1360 (Step 3460).

The main DKC 1030' sets to 1 the bit of the main bitmap B 1350 corresponding to the block in which the transferred data is stored (Step 3470) to write the write data to the corresponding block of the main main-volume 1300 to complete the write processing A 3400 (Step 3480).

On the other hand, if it is judged in Step 3420 that the main freezing mode is in the OFF state, then the main DKC 1030' sets to 1 the corresponding bit of the main bitmap A to execute the processing in Step 3480 (Step 3490).

Figure 16:
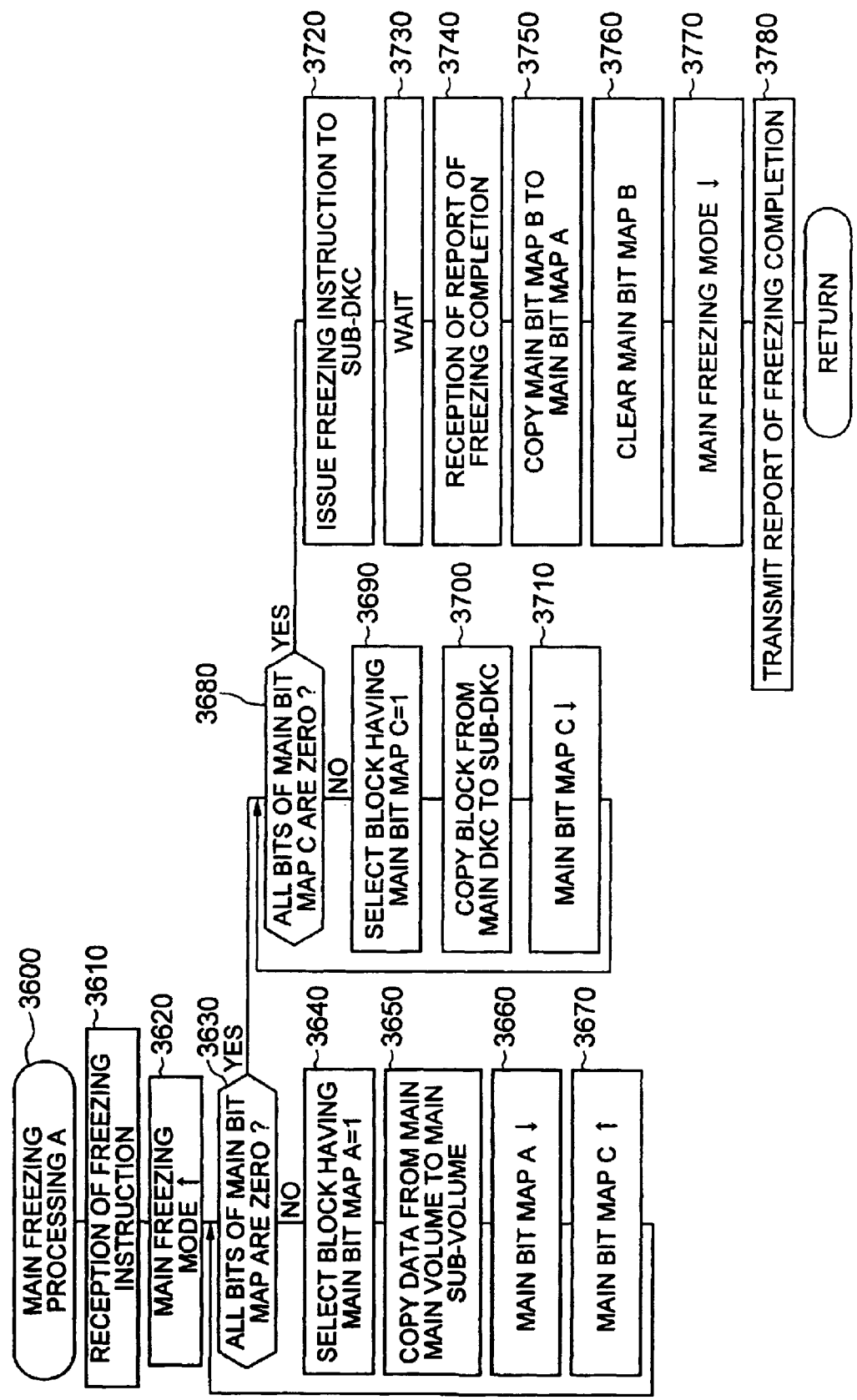
FIG. 16 is a flow chart useful in explaining the main freezing processing A in the second embodiment.

FIG. 16 is a flow chart useful in explaining the main freezing processing A 3600 which the main DKC 1030' executes when the host computer 1010 has issued the freezing instruction to the main DKC 1030'.

After having received the freezing instruction from the host computer 1010 (Step 3610), the main DKC 1030' makes the ON state the main freezing mode (Step 3620) to judge whether or not all of the bits of the main bitmap A 11340 is zero (Step 3630).

If it is judged in Step 3630 that all of the bits of the main bitmap A 1340 are not zero, then the main DKC 1030' specifies the block in which the bit is 1 in the main bitmap A 1340 (Step 3640). Then, the main DKC 1030' reads out the specified block of the main main volume 1300 to control the main disk 1130' in such a way as to copy the block thus read out to the main sub-volume 1310 (Step 3650).

After completion of the copy of the specified block, the main DKC 1030' sets to zero the corresponding bit of the main bitmap A 1340 (Step 3660), while sets to 1 the corresponding bit of the main bitmap C 1360 to return back to the processing in Step 3630 (Step 3670).

If it is judged in Step 3630 that all of the bits of the main bitmap A 1340 are zero, then the main DKC 1030' judges whether or not all of the bits of the bitmap C1360 are zero (Step 3680).

If it is judged in Step 3680 that all of the bits of the main bitmap C1360 are not zero, then the main DKC 1030' selects the bit as 1 of the main bitmap C 1360 (Step 3690) to read out the block corresponding to the bit of the main sub-volume 1310 to transmit the block thus read out to the sub-DKC 1040' (Step 3700).

The main DKC 1030' sets to zero the corresponding bit of the main bitmap C 1360 to return back to the processing in Step 3680 (Step 3710).

On the other hand, if it is judged in Step 3680 that all of the bits of the main bitmap C 1360 are zero, then the main DKC 1030' issues the freezing instruction to the sub-DKC 1040' (Step 3720) to wait for the report exhibiting the freezing completion to be transmitted thereto from the sub-DKC 1040' (Step 3730).

After having received the report exhibiting the completion of the freezing from the sub-DKC 1040' (Step 3740), the main DKC 1030' copies the contents of the main bitmap B 1350 to the main bitmap A 1340 (Step 3750) to set to zero all of the bits of the main bitmap B 1350 (Step 3760). The main DKC 1030' makes the OFF state the main freezing mode 1060 (Step 3770) to transmit the report exhibiting the freezing completion to the host computer 1010 to complete the main freezing processing A 3600 (Step 3780).

Figure 17:
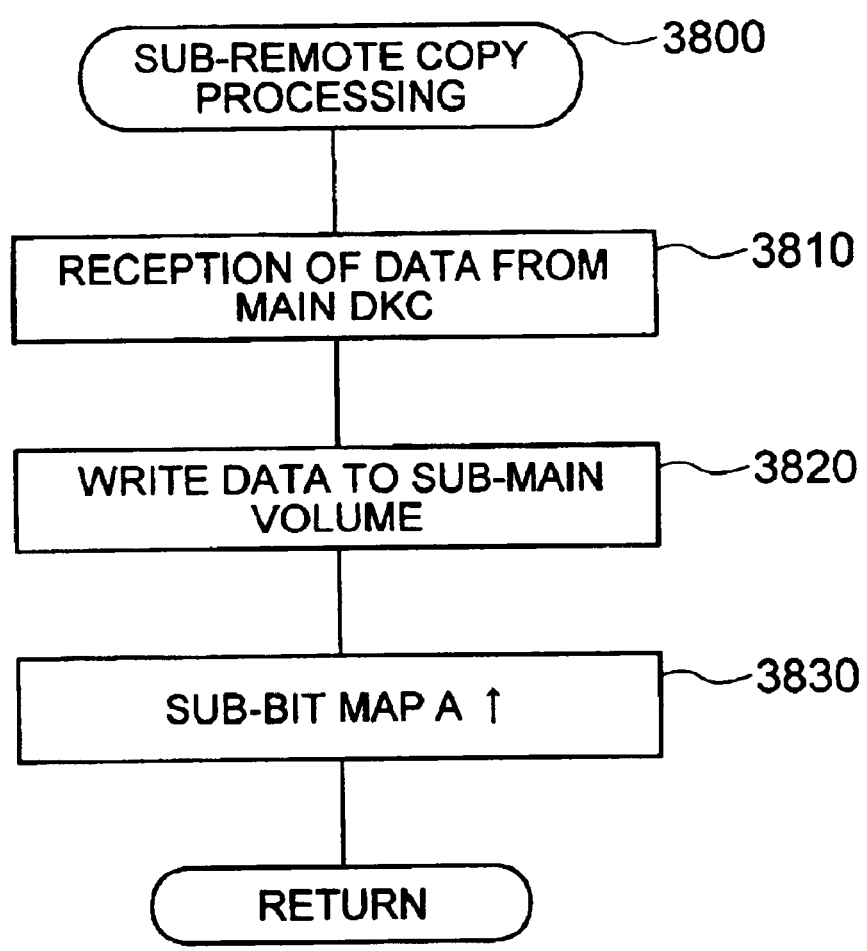
FIG. 17 is a flow chart useful in explaining the sub-remote copy processing A in the second-embodiment.

FIG. 17 is a flow chart useful in explaining the sub-remote copy processing A 3800 which the sub-DKC 1040 executes when the processing of the remote copy is executed for the sub-DKC 1040 in Step 3700 of the main freezing processing A 3600.

After having received the data from the main DKC 1030' (Step 3810), the sub-DKC 1040 controls the sub-disk unit 1160 in such a way that the received data is written to the corresponding block of the sub-main-volume 1320 (Step 3820).

After the processing of writing the data has been completed, the sub-DKC 1040 sets to 1 the corresponding bit of the sub-bitmap A 1370 to complete the sub-remote copy processing A 3800 (Step 3830).

Figure 18:
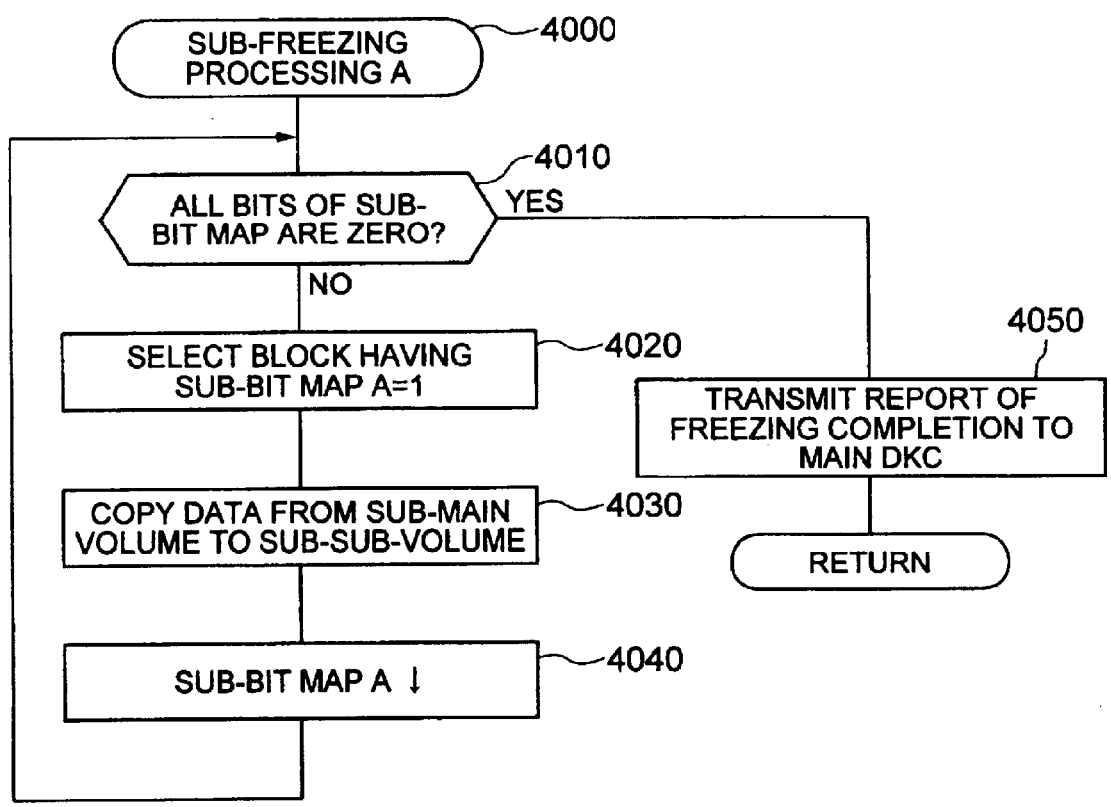
FIG. 18 is a flow chart useful in explaining the sub-freezing processing A in the second embodiment.

FIG. 18 is a flow chart useful in explaining a sub-freezing processing A 4000 which the sub-DKC 1040' executes when the main DKC 1030' has issued the freezing instruction to the sub-DKC 1040'.

The sub-DKC 1040' which has received the freezing instruction from the main DKC 1030' judges whether or not all of the bits of the sub-bitmap A 1370 are zero (Step 4010).

If it is judged in Step 4010 that all of the bits of the sub-bitmap A 1370 are not zero, then the sub-DKC 1040' controls the sub-disk unit 1160' in such a way that it selects the block of the sub-main-volume 1320 corresponding to the bit as 1 of the sub-bitmap A 1370 (Step 4020) to read out the block thus selected to copy the block thus read out to the corresponding block of the sub-sub-volume 1330 (Step 4030).

After completion of the copy of the corresponding block, the sub-DKC 1040' sets to zero the corresponding bit of the sub-bitmap A 1370 to return back to the processing in Step 4010 (Step 4040).

On the other hand, if it is judged in Step 4010 that all of the bits of the sub-bitmap A 1370 are zero, then the sub-DKC 1040' transmits the report exhibiting the completion of the freezing to the main DKC 1030' to complete the sub-freezing processing A 4000 (Step 4050).

In the present embodiment, since the data of the volume image of the main main-volume 1300 at a time point when the host computer 1010 issued the freezing instruction last time is stored in either the sub-sub-volume 1330 or the sub-main-volume 1320, the processing corresponding to the sub-recovery processing 3000 become unnecessary.

When the read request has been made from the host computer 1010, the processing(s) as in the first embodiment does(do) not need to be executed, and the data of the main main-volume 1300 has only to be transferred.

Figure 19:
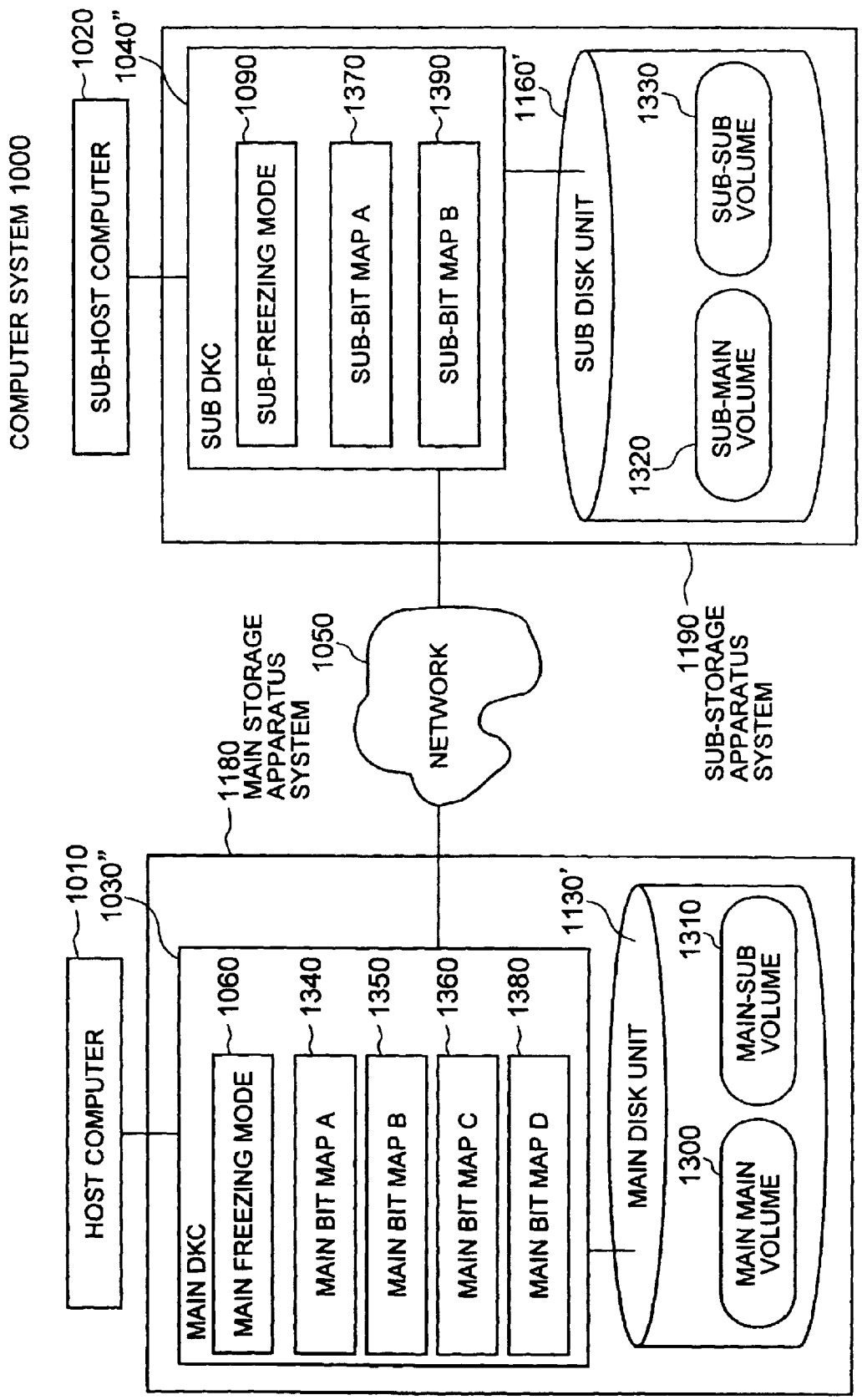
FIG. 19 is a block diagram showing a configuration of a computer system to which a third embodiment of the present invention is applied.

FIG. 19 is a block diagram showing a configuration of a third embodiment of the computer system 1000 to which the present invention is applied.

In the present embodiment, a point that the remote copy is carried out only in FIG. 13C of FIGS. 13A to 13D and hence the network can not be used effectively in the second embodiment is improved.

The description will hereinafter be given with respect to only a point of difference from the second embodiment.

A main DKC 1030" has a main bitmap D 1380 which the RAM 1260 includes.

The main bitmap D 1380 shows the data which is not yet copied to the main sub-volume 1310 and which is stored in the main main-volume 1300, i.e., the block containing that data which was remote-copied to the sub-main-volume 1320 before issue of the freezing instruction.

A sub-DKC 1040" has a sub-bitmap B 1390.

The sub-bitmap B 1390 shows the block which is remote-copied from a main DKC 1030", to the sub-main volume 1320 on and after the freezing instruction has been issued this time but before the freezing instruction will be issued next time.

In the present embodiment, the main freezing mode takes the integral number from 0 to 3. The subfreezing mode shows either ON or OFF.

FIGS. 20A to 20D are respectively schematic views showing the flow of the data in the computer system 1000 of the present embodiment.

The description will hereinafter be given with respect to the present embodiment while comparing the present embodiment with FIGS. 13A to 13D showing the flow of the data in the computer system 1000 to which the second embodiment is applied.

Figure 20A:
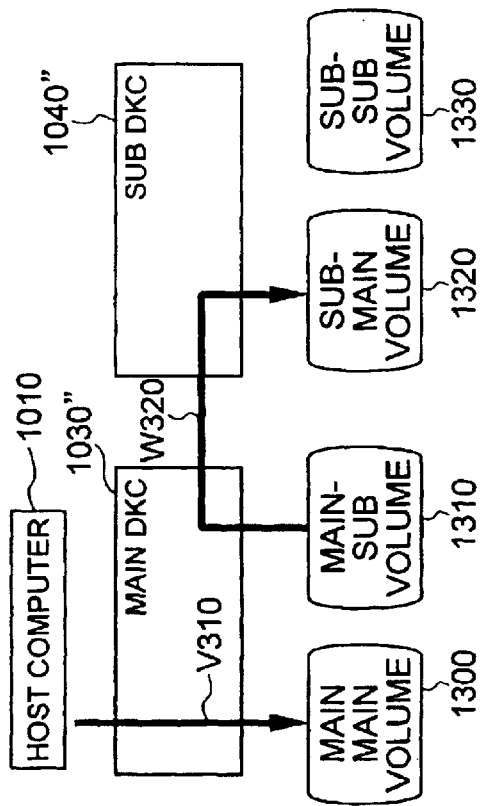
FIGS. 20A to 20D are respectively schematic views useful in explaining the flow of the data in the third embodiment.

In FIG. 20A, the data which has been written from the host computer 1010 to the main main-volume 1300 is transferred to the sub-DKC 1040" before the host computer 1010 issues the freezing instruction (indicated by an arrow R 270). An arrow Q 260 corresponds to the arrow J 190 shown in FIG. 13A.

Figure 20B:
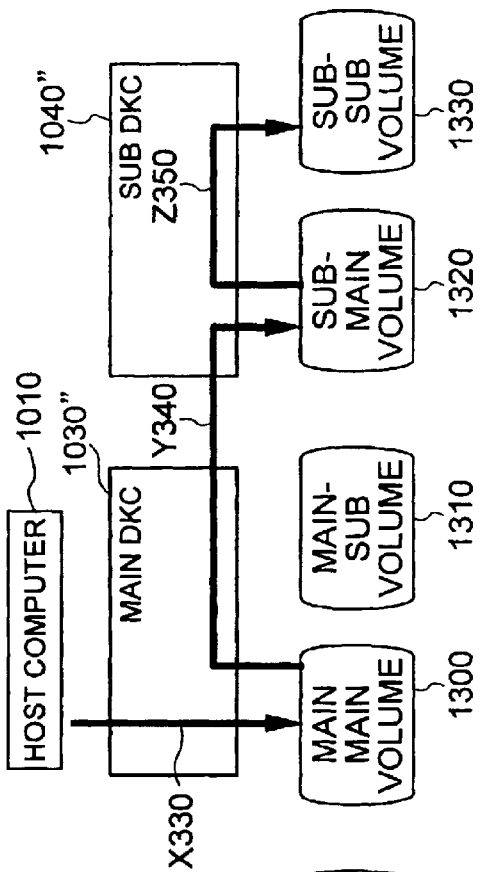

An arrow S 280 and an arrow T 290 in FIG. 20B show the flow of the data corresponding to the arrow K 200 and the arrow L 210 in FIG. 13B, respectively.

The data which has already been copied (indicated by the arrow T 290) to the main sub-volume 1310 but which is not yet sent to the sub-main-volume 1320 is transferred from the corresponding block of the main sub-volume 1310 to the sub-DKC 1040" through the main DKC 1030" to be written to the sub-main-volume 1320 (indicated by an arrow K 300).

Figure 20C:
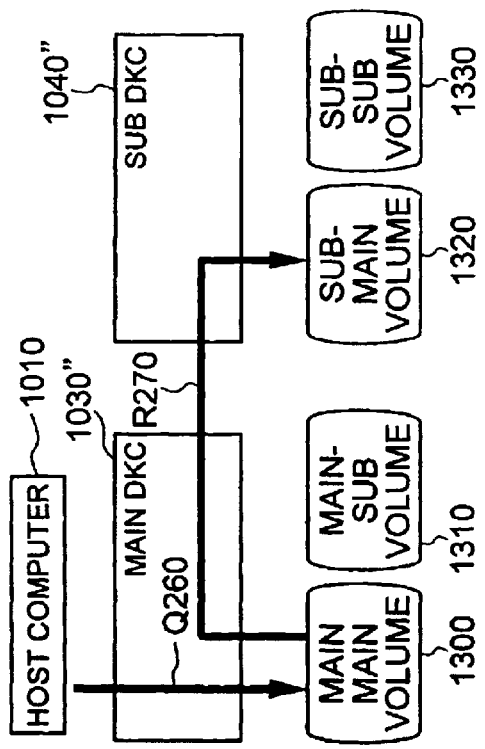

An arrow V 310 and an arrow W 320 shown in FIG. 20C correspond to the arrow M 220 and the arrow N 230 shown in FIG. 13C, respectively.

Figure 20D:
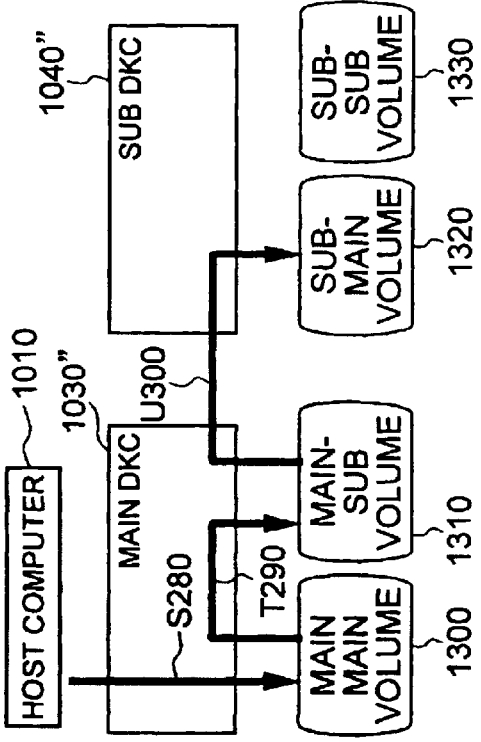

An arrow X 330 and an arrow Z 350 shown in FIG. 20D correspond to the arrow 0 and the arrow P shown in FIG. 13, respectively.

The data which has been newly written to the main main-volume 1300 (indicated by the arrow X 330) is copied to the sub-main-volume 1320 (indicated by an arrow Y 340) before the host computer 1010 issues the next freezing instruction.

In the case where the data for the block which is not yet copied from the sub-main-volume 1320 to the sub-sub-volume 1300 has been received from the main DKC 1030" by the sub-DKC 1040", the sub-DKC 1040" copies the data in the block corresponding to the data which has been received once from the sub-main-volume 1320 to the sub-sub-volume 1330 (indicated by the arrow Z 350). Thereafter, the sub-DKC 1040" controls the sub-disk unit 1160' in such a way that the data is written to the corresponding block of the sub-main-volume 1320.

FIG. 21 is a schematic view useful in explaining the flow of the freezing instruction in the computer system 1000 to which the present embodiment is applied. In the figure, the vertical direction represents the time base, and hence the time elapses as the position on the drawing is located more downwardly.

Comparing FIG. 21 with FIG. 14, it is understood that a point of difference is that the remote copy is carried out for a longer time period.

FIG. 22 is a flow chart useful in explaining a write processing B 4200 which the main DKC 1030" executes when the data has been transferred from the host computer 1010 to the main storage apparatus system 1180.

The main DKC 1030" receives the write data from the host computer 1010.(Step 4210) to judge whether or not the main freezing mode 1060 is zero (Step 4220). If it is judged in Step 4220 that the main freezing mode 1060 is not zero, then the main DKC 1030" judges whether or not the main freezing mode 1060 is 1 (step 4230).

If it is judged in Step 4230 that the main freezing mode 1060 is not 1, then the main DKC 1030" judges whether or not the main freezing mode 1060 is 2 (Step 4240).

If it is judged in Step 4240 that the main freezing mode 1060 is 2, then the main DKC 1030" executes the processing in Step 4260. On the other hand, if it is judged in Step 4240 that the freezing mode 1060 is not 2 (i.e., it is judged to be 3), then the main DKC 1030" sets to zero the bit of the main bitmap D 1380 corresponding to the transferred block (Step 4250).

The main DKC 1030" sets to 1 the bit corresponding to the write data of the main bitmap A 1340 (Step 4260) and controls the main disk unit 1130" in such a way that the write data is stored in the corresponding block of the main main-volume 1300 to complete the main write processing B 4200 (Step 4270).

On the other hand, if it is judged in Step 4220 that the main freezing mode 1060 is zero, then the main DKC 1030" sets to zero the corresponding bit of the main bitmap C 1380 to execute the processing in Step 4250 (Step 4280).

In addition, if it is judged in Step 4230 that the main freezing mode 1060 is 1, then the main DKC 1030" judges whether or not the corresponding bit of the main bitmap A 1340 is 1 (Step 4290). If it is judged in Step 4290 that the corresponding bit is zero, then the main DKC 1030" executes the processing in Step 4330. On the other hand, if it is judged in Step 4290 that the corresponding bit is 1, then the main DKC 1030" controls the main disk unit 1160' in such a way that the data of the block of the main main-volume 1300 corresponding to the bit of interest is copied to the corresponding block of the main sub-volume 1310 (Step 4300).

The main DKC 1030", sets to zero the bit of the main bitmap A 1340 corresponding to the copied data (Step 4310). The main DKC 1030" sets to 1 the bit of the main bitmap C 1360 corresponding to the copied data (Step 4320). In addition, the main DKC 1030" sets to 1 the bit of the main bitmap B 1350 corresponding to the copied data (Step 4330) to return back to the processing in Step 4270.

Figure 23:
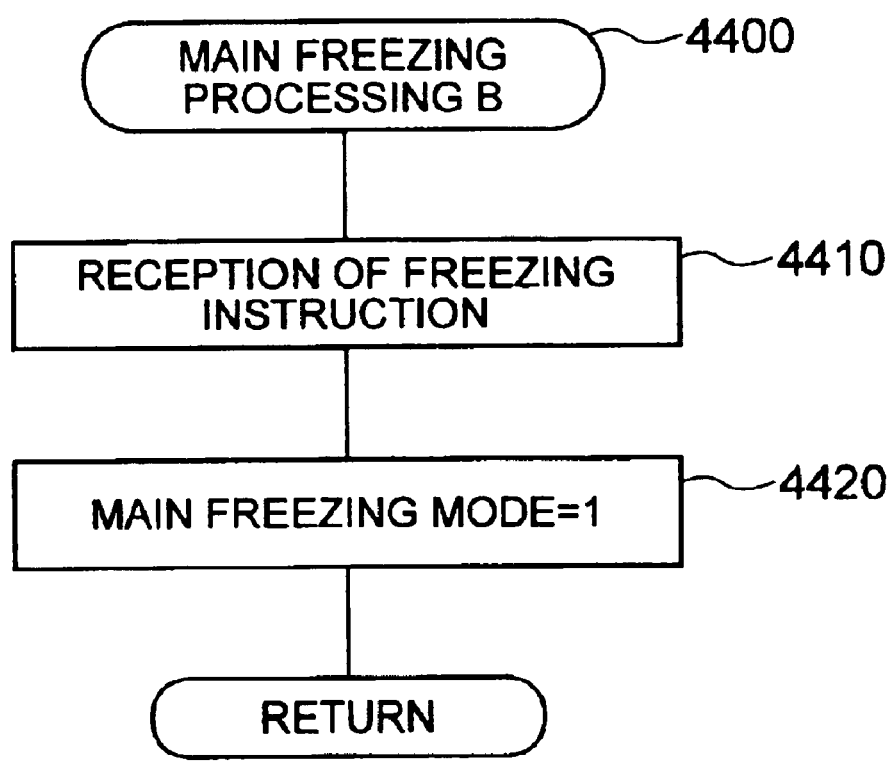
FIG. 23 is a flow chart useful in explaining the main freezing processing B in the third embodiment.

FIG. 23 is a flow chart useful in explaining a main freezing processing B 4400 which the main DKC 1030" executes when the host computer 1010 has issued the freezing instruction to the main DKC 1030".

After having received the freezing instruction from the host computer 1010 (Step 4410), the main DKC 1030" sets to 1 the main freezing mode 1060 to complete the main freezing processing B 4400 (Step 4420).

Figure 24:
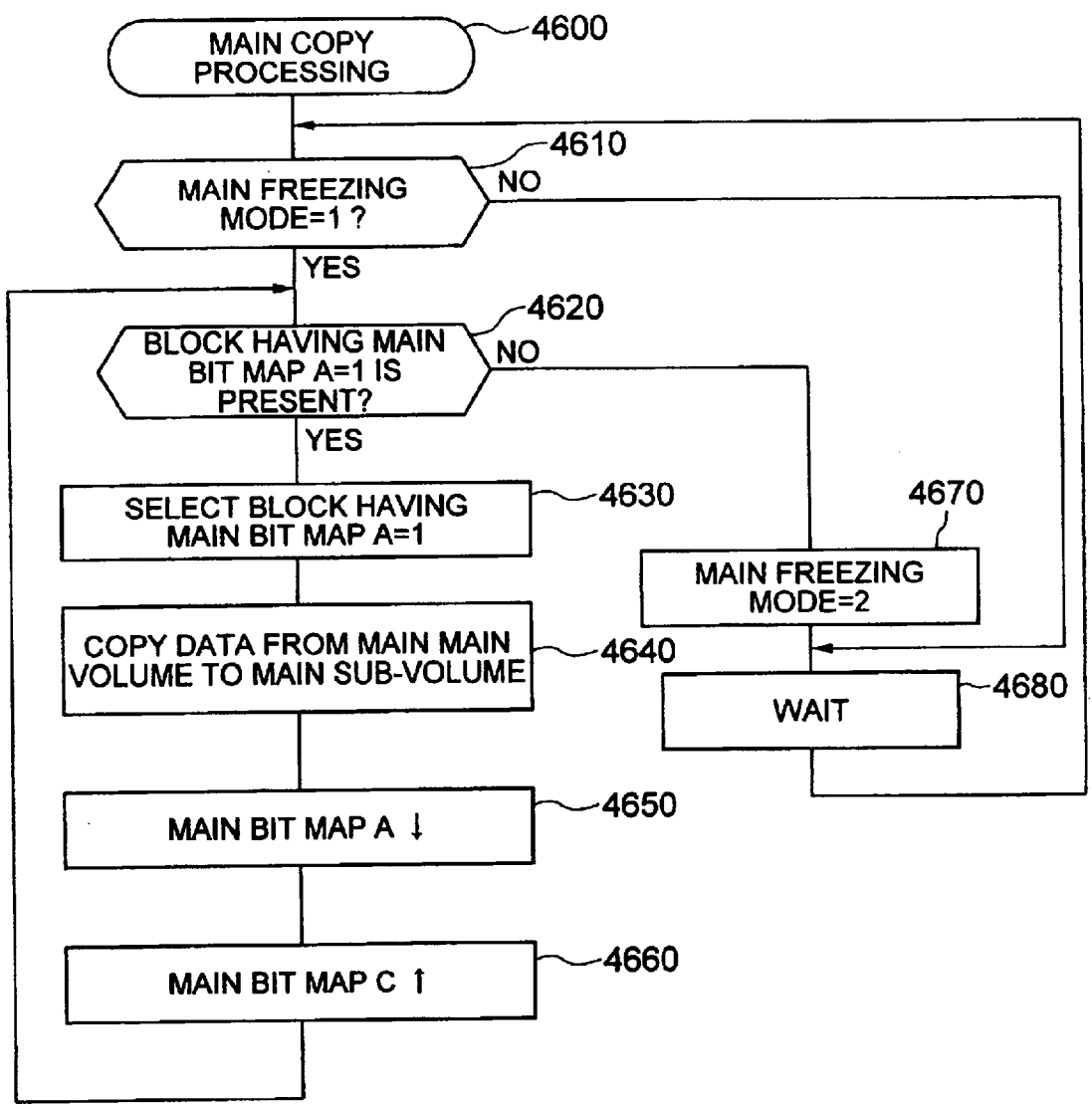
FIG. 24 is a flow chart useful in explaining the main copy processing B in the third embodiment.

FIG. 24 is a flow chart useful in explaining a main copy processing 4600 which is activated by the main DKC 1030" at the time when turning ON the power source of the main storage apparatus system 1180, and thereafter the main DKC 1030" continues to execute as one task.

The main DKC 1030" judges whether or not the main freezing mode 1060 is 1 (Step 4610). If it is judged in Step 4610 that the main freezing mode 1060 is 1, then the main DKC 1030" judges whether or not the bit of 1 is present in the bits contained in the main bitmap A 1340 (Step 4620).

If it is judged in Step 4610 that the bit of 1 is present in the bits contained in the main bitmap A 1340, then the main DKC 1030" controls the main disk unit 1130" in such a way that the block corresponding to the bit of interest is selected (Step 4630), and the data of the block corresponding to the bit of the main main volume 1300 thus selected is copied to the corresponding block of the main sub-volume 1310 (Step 4640).

After completion of the copy, the main DKC 1030" sets to zero the corresponding bit of the main bitmap A 1340 (Step 4650), while sets to 1 the corresponding bit of the main bitmap C 1360 to return back to the processing in Step 4620 (Step 4660).

On the other hand, if it is judged in Step 4610 that the main freezing mode is not 1, then the main DKC 1030" executes the processing in Step 4680.

In addition, if it is judged in Step 4620 that the bit of 1 is absent in the main bitmap A 1340, then the main DKC 1030" sets to 2 the main freezing mode 1060 (Step 4670), and carries out waiting for some time to return back to the processing in Step 4610 (Step 4680).

Figure 25:
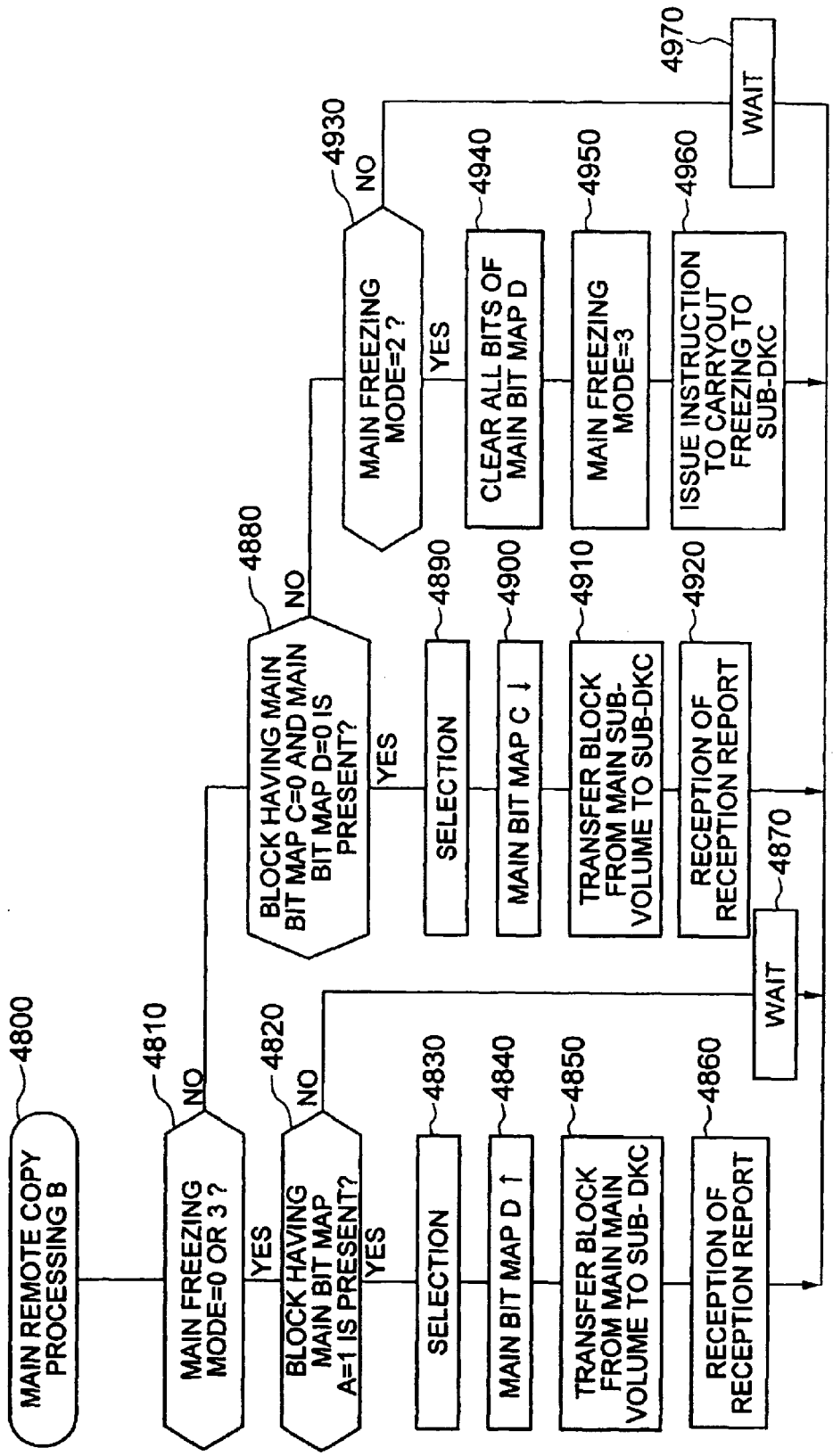
FIG. 25 is a flow chart useful in explaining the main remote copy processing B in the third embodiment.

FIG. 25 is a flow chart useful in explaining a main remote copy processing 4800 which is activated by the main DKC 1030" at the time when turning ON the power source of the main source apparatus system and which the main DKC 1030" executes as one task.

The main DKC 1030" judges whether the main freezing mode 1060 is zero or 3 (Step 4810). If it is judged in Step 4810 that the main freezing mode 1060 is zero or 3, then the main DKC 1030" judges whether or not the block in which the bit of the main bitmap A 1340 is 2 is present (Step 4820). If so, the main DKC 1030' selects the block of interest (Step 4830).

The main DKC 1030" sets to 1 the bit of the main bitmap D 1380 corresponding to the selected block (Step 4840) to read out the corresponding block from the main main-volume 1300 to transmit the block from read out to the sub-DKC 1040" (Step 4850).

The main DKC 1030" receives the report exhibiting the reception of the data from the sub-DKC 1040" to return back to the processing in Step 4810 (Step 4860).

On the other hand, if it is judged in Step 4820 that the block in which the bit of the main bitmap A 1340 is 1 is absent, then the main DKC 1030" carries out step of waiting for some time (for about several milliseconds) to return back to the processing in Step 4810 (Step 4870).

In addition, if it is judged in Step 4810 that the main freezing mode 1060 is neither zero nor 3, then the main DKC 1030" judges whether or not the block is present in which the main bitmap C 1360 is 1 and also the main bitmap D 1380 is zero (Step 4880).

If it is judged in Step 4880 that the block fulfilling the above-mention conditions is present, then the main DKC 1030" selects the block of interest (Step 4890) to set to zero the corresponding bit of the main bitmap C 1360 (Step 4900). The main DKC 1030" reads out the block thus selected from the main sub-volume 1310 to transfer the block thus read out to the sub-DKC 1040" (Step 4910).

The main DKC 1030" receives the report exhibiting the reception of the data from the sub-DKC 1040" to return back to the processing in Step 4810 (Step 4920).

On the other hand, if it is judged in Step 4880 that the block is not present in which the main bitmap C 1360 is 1 and also the main bitmap D 1380 is zero, then the main DKC 1030" judges whether or not the main freezing mode 1060 is 2 (Step 4930).

If it is judged in Step 4930 that the main freezing mode 1060 is 2, then the main DKC 1030" clears all of the bits in the main bitmap D 1380 to zero (Step 4940), and sets to 3 the main freezing mode 1060 (Step 4950) and then issues the freezing instruction to the sub-DKC 1040" to return back to the processing in Step 4810 (Step 4960).

On the other hand, if it is judged in Step 4930 that the main freezing mode 1060 is not 2, then the main DKC 1030" carried out the step of waiting for some time (for about several milliseconds) to return back to the processing in Step 4810 (Step 4970).

Figure 26:
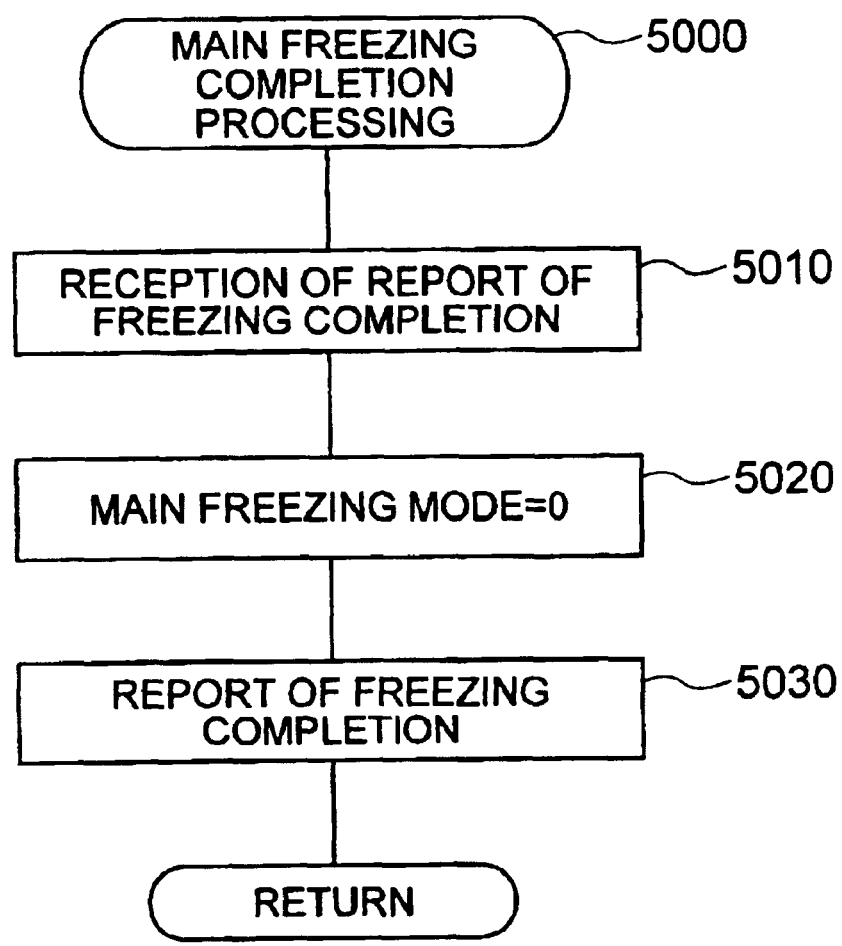
FIG. 26 is a flow chart useful in explaining the main freezing completion processing in the third embodiment.

FIG. 26 is a flow chart useful in explaining a main freezing completion processing 5000 which the main DKC 1030" executes at the time when having received the report exhibiting the completion of the freezing from the sub-DKC 1040".

After having received the report exhibiting the freezing completion from the sub-DKC 1040" (Step 5010), the main DKC 1030" sets to zero the main freezing mode 1060 (Step 5020) and informs the host computer 1010 of the freezing completion to complete the main freezing completion processing 5000 (Step 5030).

Figure 27:
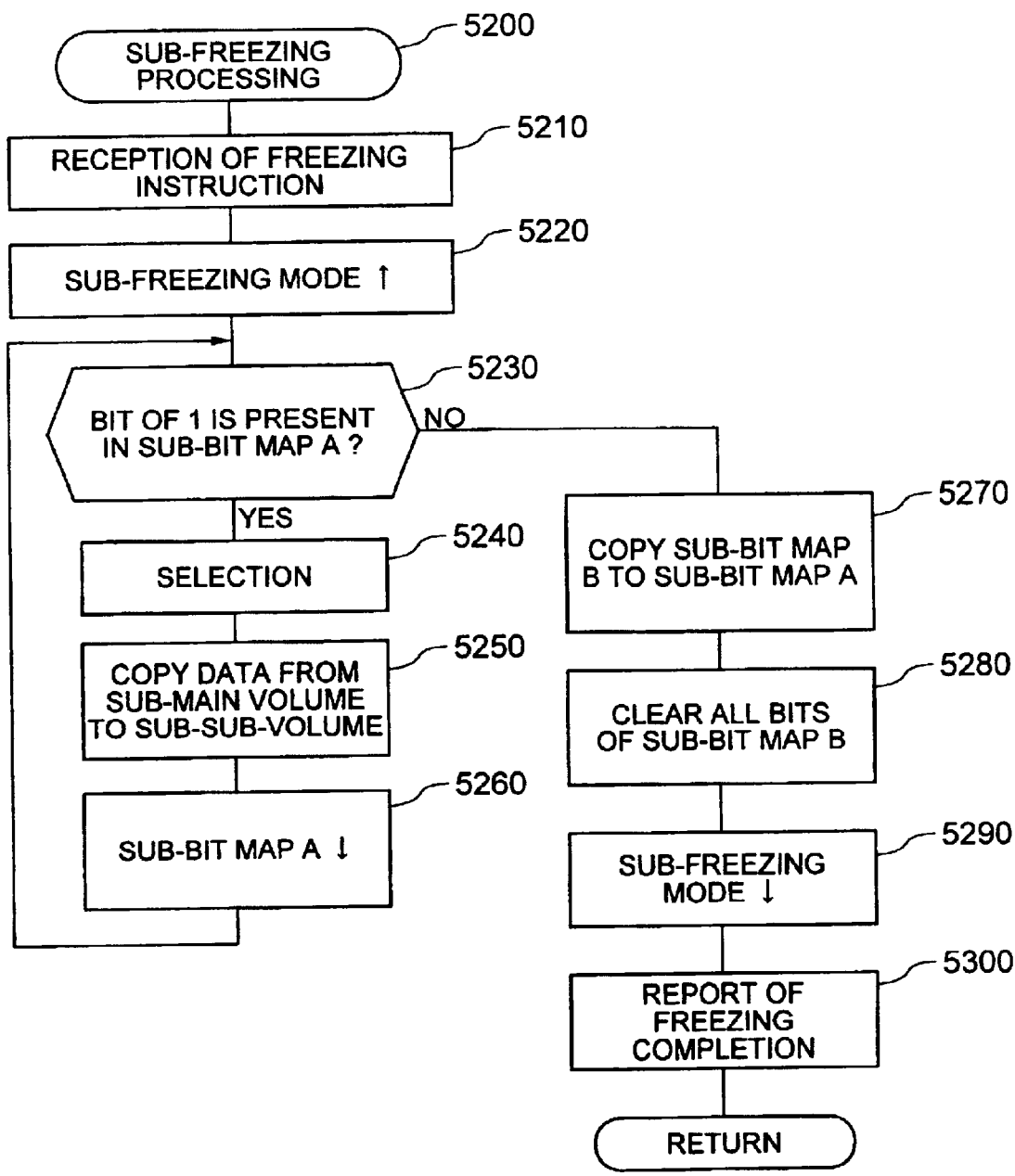
FIG. 27 is a flow chart useful in explaining the sub-freezing processing in the third embodiment.

FIG. 27 is a flow chart useful in explaining a sub-freezing processing 5200 which the sub-DKC 1040" executes at the time when the main DKC 1030" has issued the freezing instruction to the sub-DKC 1040".

After having received the freezing instruction from the main DKC 1030" (Step 5210), the sub-DKC 1040" makes the ON state the sub-freezing mode 1090 (Step 5220) to judge whether or not the bit of 1 is present in the sub-bitmap A 1370 (Step 5230).

If it is judged in Step 5230 that the bit of 1 is present in the sub-bitmap A 1370, then the sub-DKC 1040" controls the sub-disk unit 1160' in such a way that the block corresponding to the bit of interest is selected (Step 5240), and the block thus selected of the sub-main-volume 1320 is read out to be copied to the corresponding block of the sub-sub-volume 1330 (Step 5250).

The sub-DKC 1040" sets to zero the corresponding bit of the sub-bitmap A 1370 to return back to processing in Step 5230 (Step 5260).

On the other hand, if it is judged in Step 5230 that the bit of 1 is absent in the sub-bitmap A 1370, then the sub-DKC 1040" copies the sub-bitmap B 1390 to the sub-bitmap A 1370 (Step 5270) to make all of the bits of the sub-bitmap B 1390 to zero (Step 5280).

The sub-DKC 1040" makes the OFF state the sub-freezing mode 1090 (Step 5290) and informs the main DKC 1040" of the freezing completion to complete the sub-freezing processing 5200 (Step 5300).

Figure 28:
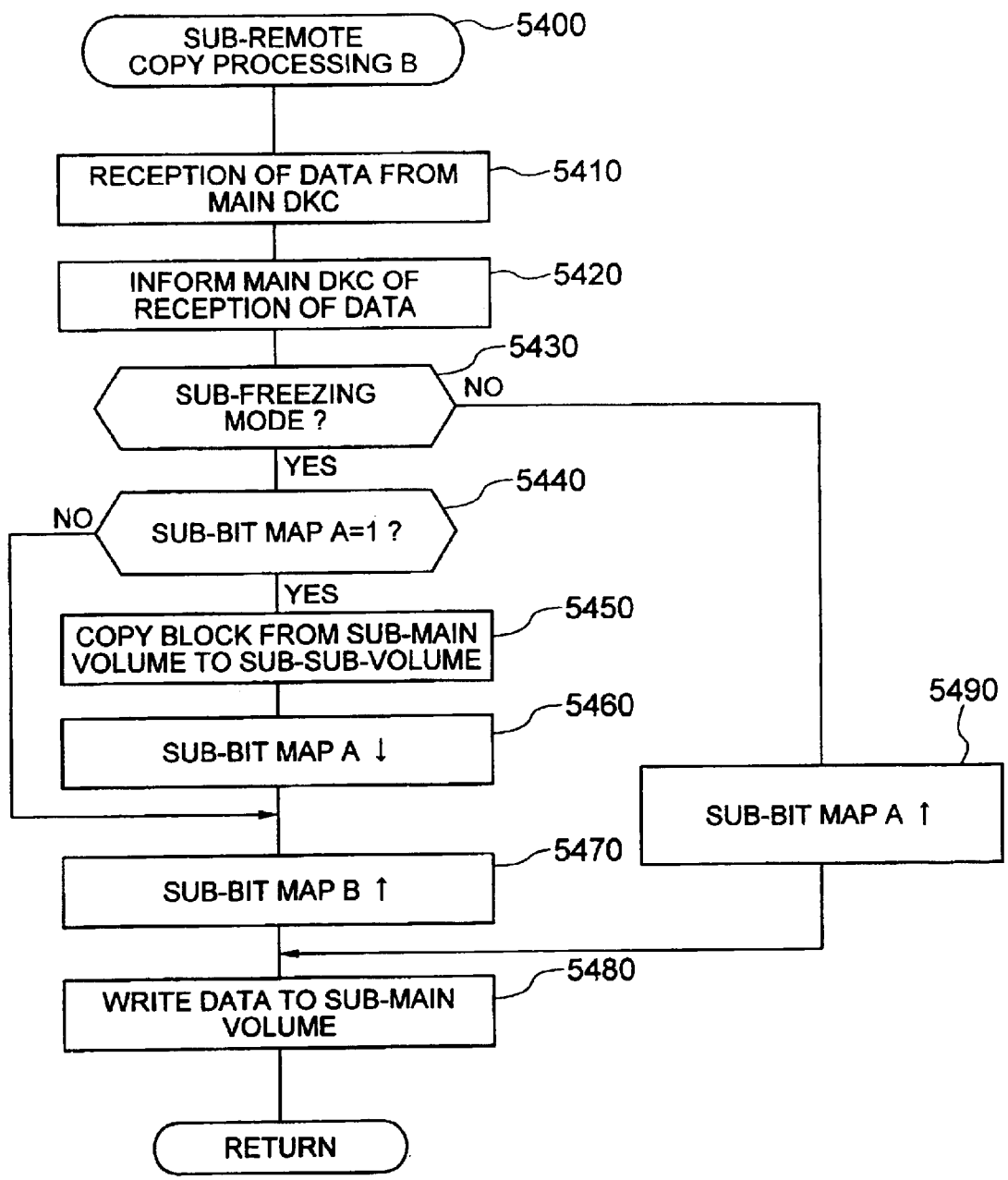
FIG. 28 is a flow chart useful in explaining the sub-remote copy processing B in the third embodiment.

FIG. 28 is a flow chart useful in explaining a sub-remote copy processing B 5400 which the sub-DKC 1040" executes at the time when in Step 4910 in the main remote copy processing B 4800, the main DKC 1030" remote-copies the data to the sub-DKC 1040".

After having received the data from the main DKC 1030" (Step 5410), the sub-DKC 1040" informs the main DKC 1030" of the reception of the data (Step 5420).

Thereafter, the sub-DKC 1040" judges whether or not the sub-freezing mode 1090 is in the ON state (Step 5430). If it is judged in Step 5430 that the sub-freezing mode 1090 is in the ON state, then the sub-DKC 1040" judges whether or not that the bit of 1 is present in the sub-bitmap A 1370 (Step 5440). If it is judged in Step 5440 that the bit of 1 is absent in the sub-bitmap A 1370, then the sub-DKC 1040" executes the processing in Step 5470.

On the other hand, if it is judged in Step 5440 that the bit of 1 is present in the sub-bitmap A 1370, then the sub-DKC 1040" controls the sub-disk unit 1160" in such a way that the block of the sub-main-volume 1320 corresponding to the bit of 1 is read out to be copied to the corresponding block of the sub-sub-volume 1330 (Step 5450).

The sub-DKC 1040" sets to zero the corresponding bit of the sub-bitmap A 1370 (Step 5460), while sets to 1 the corresponding bit of the sub-bitmap B 1390 (Step 5470). The sub-DKC 1040" controls the sub-disk unit 1160' in such a way that the received data is written to the sub-main volume 1320 to complete the sub-remote copy processing B 5400 (Step 5480).

On the other hand, if it is judged in Step 5430 that the sub-freezing mode 1090 is in the OFF state, then the sub-DKC 1040" makes 1 the corresponding bit of the sub-bitmap A 1370 to execute the processing in Step 5480 (Step 5490).

In the present embodiment, since the volume image of the main main-volume 1300 at a time point when the host computer 1010 issued the freezing instruction last time is held in the form of the data stored in the sub-sub-volume 1330 or in the form of the combination of the data which is stored in the sub-sub-volume 1330 and the sub-main-volume 1320, the processing corresponding to the sub-recovery processing 3000 becomes unnecessary.

When the request to read the data has been made from the host computer 1010, the data of the main main-volume 1300 may be transferred thereto.

Next, a fourth embodiment of the present invention will hereinafter be described.

A point of difference of the fourth embodiment from other embodiments is that the data which is transferred from the main storage apparatus system 1130 to the sub-storage apparatus system 1160 is encrypted.

The fourth embodiment will now be described on the basis of the second embodiment. But, it goes without saying that in the first embodiment and the third embodiment as well, the present embodiment can be adopted.

In the present embodiment, when the data is transferred from the main main-volume 1300 to the main sub-volume 1310, the data to be transferred is encrypted (encoded).

In addition, the encrypted data is transferred from the main sub-volume 1310 to the sub-main-volume 1320, and when the encrypted data is copied from the sub-main-volume 1320 to the sub-sub-volume 1330, the data of interest is decoded.

As a result, the encrypted data will be transferred on the network 1050. The description will hereinbelow be given with respect to a point of difference from the second embodiment.

In the present embodiment, in FIG. 13B, the data is copied from the main main-volume 1300 to the main sub-volume 1310 while the data is encrypted (encoded) (indicated by an arrow L 210).

In addition, in FIG. 13D, in the sub-DKC 1040', the data is copied from the sub-main-volume 1320 to the sub-sub-volume 1330 while the encrypted data is decoded (indicated by an arrow P 250).

In FIG. 14, the stored data is encrypted when the main DKC 1030' is split. In addition, when the sub-DKC 1040' is split, the stored data which is already encrypted is decoded.

In Step 3440, shown in FIG. 15, the main DKC 1030' copies the data stored in the corresponding block from the main main-volume 1300 to the main sub-volume 1310 after the encryption of the data of interest.

In Step 3650 shown in FIG. 16, the main DKC 1030' controls the main disk unit 1130' in such a way that the corresponding block of the main main-volume 1300 is read out to be encrypted, and the encrypted data is copied to the main sub-volume 1310.

In Step 4030 shown in FIG. 18, the sub-DKC 1040' controls the sub-disk unit 1160' in such a way that the corresponding block of the sub-main-volume 1320 is read out to the sub-DKC 1040' and the encrypted data is decoded to be copied to the corresponding block of the sub-sub-volume 1330.

By adopting the configuration of the present embodiment, the volume image in the freezing can be ensured in any one of the disk units while ensuring the safety of the data which is being transferred.

By adopting the configuration of the present invention, even when the remote copy of no guarantee to order is carried out, the volume image having excellent coherency can be ensured.

While the present invention has been particularly shown and described with reference to the preferred embodiments, it will be understood that the various changes and modifications will occur to those skilled in the art without departing from the scope and true spirit of the invention. The scope of the invention is therefor to be determined solely by the appended claims.

What is claimed is:

1. A computer system comprising:
    a first storage system comprising a first disk controller for receiving data from a host computer and one or more first disks each of which is coupled to the first disk controller;
    a second storage system comprising a second disk controller and one or more second disks each of which is coupled to the second disk controller; and
    a network to which the first storage system and the second storage system are operatively coupled,
    wherein the first disk controller stores data received from the host computer to a first storage area of the first storage system and sends the data to the second storage system,
    wherein the second disk controller stores data received from the first disk controller to a third storage area of the second storage system,
    wherein, after the first storage system receives a first instruction from the host computer, the first disk controller:
        sends to the second disk controller, as received data, first data that is stored in the first storage area at a time when the first instruction was received;
        receives from the host computer update data corresponding to the first data; and
        manages the update data such that the update data can be distinguished from the first data,
    wherein the second disk controller stores the received data to the third storage area as second received data,
    wherein the first disk controller sends a second instruction to the second disk controller, and after the second instruction is sent, the first disk controller sends the update data to the second disk controller as received update data,
    wherein after the second disk controller receives the second instruction from the first disk controller, the second disk controller stores the second received data from the third storage area to a fourth storage area in the second storage system and manages the received update data such that the update data can be distinguished from the first data.

2. The computer system of claim 1, wherein after the first instruction from the host computer is received at the first storage system, the first disk controller stores the update data either to the first storage area if the corresponding first data was already sent to the second storage system or to a second storage area in the first storage system if the corresponding first data was not sent to the second storage system.

3. The computer system of claim 2, wherein before completion of storing the first data stored to the fourth storage area, the second disk controller stores the update data to a fifth storage area in the second storage system so that the first data can be distinguished from the update data in the second storage system.

4. The computer system of claim 1, wherein after the first instruction from the host computer is received at the first storage system, the first disk controller:
    stores the first data in the first storage area to a second storage area in the first storage system;
    sends the first data stored in the second storage area to the second disk controller, if the first data was not sent to the second storage system; and
    stores the corresponding update data to the first storage area after the first data is stored in the second storage area.

5. The computer system of claim 4, wherein after the second disk controller receives the second instruction from the first disk controller, the second disk controller stores the update data to the third storage area after the corresponding first data is stored in the fourth storage area, so that the update data can be distinguished from the first data.

6. A first storage system comprising:
    a disk controller for receiving data from a host computer; and
    one or more disks each of which is coupled to the disk controller,
    wherein the disk controller stores data received from the host computer to a first storage area of the first storage system and sends the data to a second storage system,
    wherein after a first instruction from the host computer is received at the first storage system, the disk controller:
        sends to the second storage system, as received data, first data that is stored in the first storage area at a time the first instruction has been received;
        receives from the host computer update data corresponding to the first data; and
        manages the update data such that the update data can be distinguished from the first data,
    wherein the disk controller sends a second instruction to the second storage system to make the second storage system hold the first data when transmission of the first data is completed,
    wherein after the first instruction from the host computer is received at the first storage system, the disk controller stores the update data to the first storage area if the corresponding first data was already sent to the second storage system, and the disk controller stores the update data to a second storage area in the first storage system if the corresponding first data had not yet been sent to the second storage system.

* * * * *